United States Patent
Yamada et al.

(10) Patent No.: US 9,055,096 B2
(45) Date of Patent: Jun. 9, 2015

(54) APPARATUS AND METHOD FOR DETECTING AN ATTACK IN A COMPUTER NETWORK

(71) Applicants: Masahiro Yamada, Kawasaki (JP); Masanobu Morinaga, Yokohama (JP); Yuki Fujishima, Yokohama (JP)

(72) Inventors: Masahiro Yamada, Kawasaki (JP); Masanobu Morinaga, Yokohama (JP); Yuki Fujishima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/291,168

(22) Filed: May 30, 2014

(65) Prior Publication Data

US 2015/0013005 A1    Jan. 8, 2015

(30) Foreign Application Priority Data

Jul. 4, 2013    (JP) .................. 2013-140765

(51) Int. Cl.
*G06F 11/00*    (2006.01)
*H04L 29/06*    (2006.01)

(52) U.S. Cl.
CPC .................. *H04L 63/1416* (2013.01)

(58) Field of Classification Search
CPC .. H04L 63/1416; H04L 63/14; H04L 63/1408
USPC ........................................ 726/22
See application file for complete search history.

(56) References Cited

U.S. PATENT DOCUMENTS

| | | | | |
|---|---|---|---|---|
| 7,457,965 | B2 * | 11/2008 | Tamura et al. ................. | 713/182 |
| 7,596,097 | B1 * | 9/2009 | McCowan et al. ............ | 370/248 |
| 2005/0289231 | A1 | 12/2005 | Harada et al. | |
| 2010/0192226 | A1 * | 7/2010 | Noel et al. ...................... | 726/23 |

FOREIGN PATENT DOCUMENTS

| | | |
|---|---|---|
| JP | 2004-179999 | 6/2004 |
| JP | 2006-11683 | 1/2006 |
| JP | 2006-157144 | 6/2006 |

\* cited by examiner

*Primary Examiner* — Teshome Hailu
(74) *Attorney, Agent, or Firm* — Staas & Halsey LLP

(57) ABSTRACT

Upon acquiring first data transmitted from an outside of a predetermined range in a network, an apparatus stores, in a memory, first information including transmission source and destination addresses of the first data. Upon acquiring second data addressed to an inside of the predetermined range and indicating predetermined communication data of service initiation, the apparatus extracts the first information including as the transmission source address a source address of the second data, and stores, in the memory, second information indicating a service initiation and including a destination address of the second data, in association with the first information. When the second information including as the transmission destination address a source address of the second data is stored in the memory and a destination address of the second data coincides with the transmission source address in the first information associated with the second information, the apparatus notifies detection of an attack.

8 Claims, 27 Drawing Sheets

| EXTERNAL COMMUNICATION | | | SERVICE INITIATION | | EXTERNAL CONNECTION |
|---|---|---|---|---|---|
| TRANSMISSION SOURCE IP ADDRESS | TRANSMISSION DESTINATION IP ADDRESS | COMMUNICATION TIME | TRANSMISSION DESTINATION IP ADDRESS | COMMUNICATION TIME | COMMUNICATION TIME |
| | | | | | |
| 100.100.1.1 | 192.168.0.2 | 8:50:0.000 | 192.168.0.3 | 8:50:0.050 | 8:50:0.100 |
| ⋮ | ⋮ | ⋮ | ⋮ | ⋮ | ⋮ |

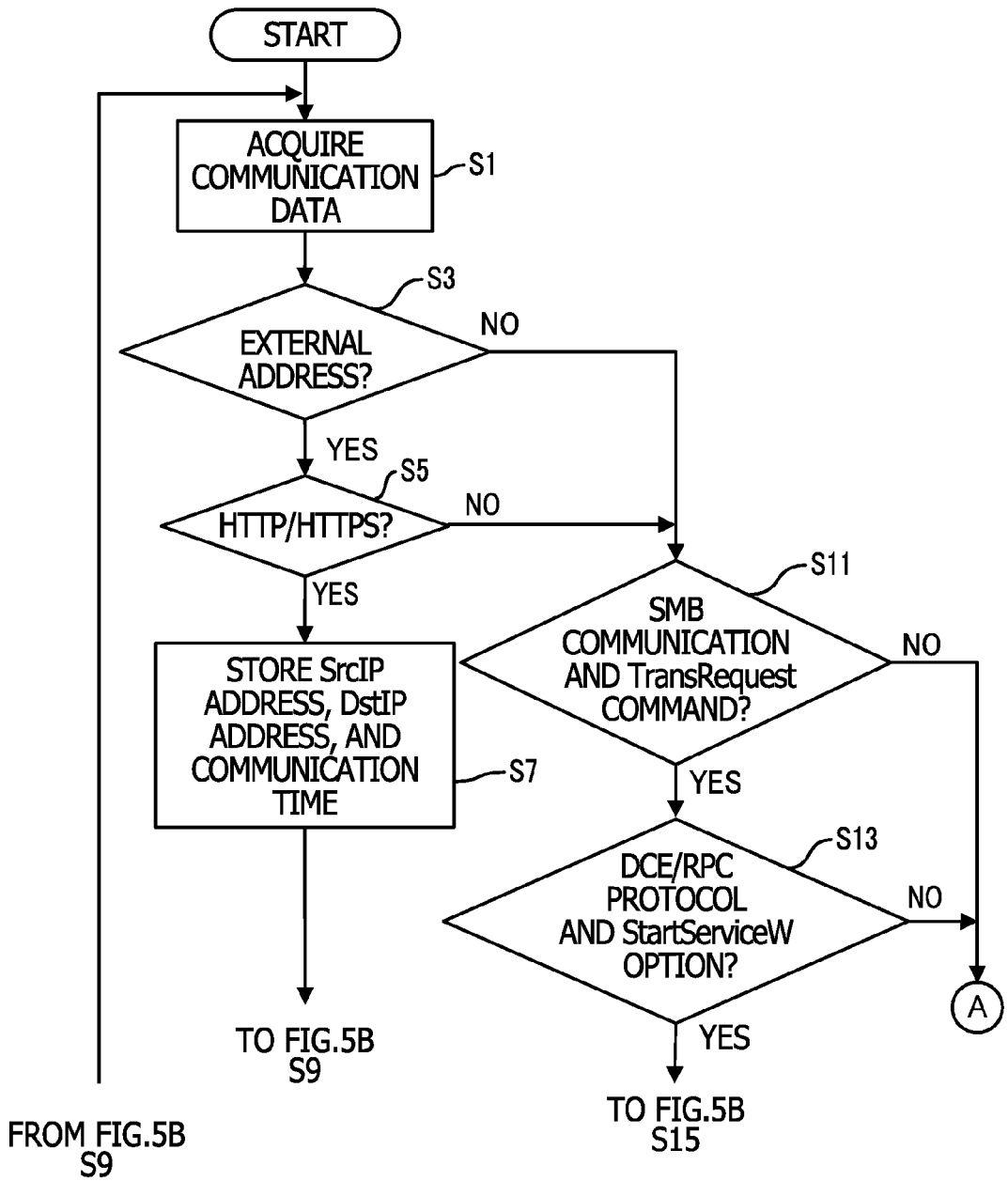

FIG.6

| EXTERNAL COMMUNICATION | | | SERVICE INITIATION | | EXTERNAL CONNECTION |
|---|---|---|---|---|---|
| TRANSMISSION SOURCE IP ADDRESS | TRANSMISSION DESTINATION IP ADDRESS | COMMUNICATION TIME | TRANSMISSION DESTINATION IP ADDRESS | COMMUNICATION TIME | COMMUNICATION TIME |
| ... | ... | ... | | | |
| 100.100.1.1 | 192.168.0.2 | 8:50:0.000 | | | |
| ... | ... | ... | | | |

FIG.7

| EXTERNAL COMMUNICATION | | | SERVICE INITIATION | | EXTERNAL CONNECTION |
|---|---|---|---|---|---|
| TRANSMISSION SOURCE IP ADDRESS | TRANSMISSION DESTINATION IP ADDRESS | COMMUNICATION TIME | TRANSMISSION DESTINATION IP ADDRESS | COMMUNICATION TIME | COMMUNICATION TIME |
| 100.100.1.1 | 192.168.0.2 | 8:50:0.000 | 192.168.0.3 | 8:50:0.050 | |
| ... | ... | ... | ... | ... | |

FIG.9

| EXTERNAL COMMUNICATION | | | SERVICE INITIATION | | EXTERNAL CONNECTION |
|---|---|---|---|---|---|
| TRANSMISSION SOURCE IP ADDRESS | TRANSMISSION DESTINATION IP ADDRESS | COMMUNICATION TIME | TRANSMISSION DESTINATION IP ADDRESS | COMMUNICATION TIME | COMMUNICATION TIME |
| 100.100.1.1 | 192.168.0.2 | 8:50:0.000 | 192.168.0.3 | 8:50:0.050 | 8:50:0.100 |
| ... | ... | ... | ... | ... | ... |

FIG.12

| TRANSMISSION SOURCE IP ADDRESS | TRANSMISSION SOURCE TCP PORT | TRANSMISSION DESTINATION IP ADDRESS | TRANSMISSION DESTINATION TCP PORT | INITIATION TIME |
|---|---|---|---|---|
| 100.100.1.1 | 443 | 192.168.0.2 | 40001 | 8:40:0.000 |
| ... | ... | ... | ... | ... |

FIG.16

| No | ATTRIBUTE | ASSUMED SEQUENCE |
|---|---|---|
| 1 | LEADING CANDIDATE | 3 way handshake |
| 2 | | Negotiate Protocol |
| 3 | LEADING CANDIDATE | Session Setup AndX |
| 4 | LEADING CANDIDATE | Tree Connect AndX |
| 5 | LEADING CANDIDATE | NT Create AndX |
| 6 | | NT Create AndX |
| 7 | | SVCCTL: CreateServiceW |
| 8 | | SVCCTL: OpenServiceW |
| 9 | SERVICE INITIATION | SVCCTL: StartServiceW |

FIG.18

| EXTERNAL COMMUNICATION | | SERVICE INITIATION | | | EXTERNAL CONNECTION |
|---|---|---|---|---|---|
| TRANSMISSION SOURCE IP ADDRESS | TRANSMISSION DESTINATION IP ADDRESS | COMMUNICATION TIME | TRANSMISSION DESTINATION IP ADDRESS | COMMUNICATION TIME | LEADING TIME OF SEQUENCE | COMMUNICATION TIME |
| ... | ... | ... | | | | |
| 100.100.1.1 | 192.168.0.2 | 8:50:0.000 | | | | |
| ... | ... | ... | | | | |

FIG.21

| EXTERNAL COMMUNICATION | | | SERVICE INITIATION | | | EXTERNAL CONNECTION |
|---|---|---|---|---|---|---|
| TRANSMISSION SOURCE IP ADDRESS | TRANSMISSION DESTINATION IP ADDRESS | COMMUNICATION TIME | TRANSMISSION DESTINATION IP ADDRESS | COMMUNICATION TIME | LEADING TIME OF SEQUENCE | COMMUNICATION TIME |
| 100.100.1.1 | 192.168.0.2 | 8:50:0.000 | 192.168.0.3 | 8:50:0.050 | 8:50:0.020 | |
| ... | ... | ... | ... | ... | ... | ... |

APPARATUS AND METHOD FOR DETECTING AN ATTACK IN A COMPUTER NETWORK

CROSS-REFERENCE TO RELATED APPLICATION

This application is based upon and claims the benefit of priority from the prior Japanese Patent Application No. 2013-140765 filed on Jul. 4, 2013, the entire contents of which are incorporated herein by reference.

FIELD

Exemplary embodiments of the present disclosure are related to apparatus and method for detecting an attack in a computer network.

BACKGROUND

Computer systems connected to a network are being attacked frequently by uniquely developed or customized malware. Especially, targeted attacks to specific enterprises are increasing. In majority of these attacks, a user terminal in an enterprise is infected first with a remote-controlled malware, and then, the infected terminal is used as a stepping-stone to intrude into other user terminals of the enterprise to infect the other user terminals with the remote-controlled malware.

A signature-based detection method has been known in which a pattern of communication data for a remotely controlled operation is defined for each malware and then, the pattern is compared with communication data flowing in a network to detect malware. However, in the signature-based detection method, only the malware for which the pattern of the communication data is previously defined can be detected and thus, the customized malware or uniquely developed malware may not be detected.

Japanese Patent Application Laid-Open No. 2004-179999, Japanese Patent Application Laid-Open No. 2006-157144 and Japanese Patent Application Laid-Open No. 2006-11683 have been known as examples of the prior art.

SUMMARY

According to an aspect of the invention, there is provided an apparatus. The apparatus acquires communication data, and stores, when the acquired communication data meets a first condition including a condition that the acquired communication data is first communication data transmitted from an outside of a predetermined range in a network, in a memory, first information regarding an external communication and including transmission source and destination addresses of the first communication data. The apparatus extracts, when the acquired communication data meets a second condition including a condition that the acquired communication data is second communication data that is addressed to an inside of the predetermined range and indicates predetermined communication data of service initiation, from the memory, the first information including as the transmission source address a source address of the acquired communication data, and store, in the memory in association with the first information, second information indicating a service initiation and including a destination address of the second communication data. The apparatus determines, when the acquired communication data is addressed to an outside of the predetermined range, whether the acquired communication data meets a third condition including a condition that the second information including as the transmission destination address a source address of the second communication data is stored in the memory and a destination address of the second communication data is coincident with the transmission source address included in the first information associated with the second information, and notify detection of an attack when it is determined that the acquired communication data meets the third condition.

The object and advantages of the disclosure will be realized and attained by means of the elements and combinations particularly pointed out in the claims. It is to be understood that both the foregoing general descriptions and the following detailed descriptions are exemplary and explanatory, and are not restrictive of the invention, as claimed.

BRIEF DESCRIPTION OF DRAWINGS

FIGS. 5A and 5B are diagrams illustrating an example of an operational flowchart, according to an embodiment.

FIG. 6 is a diagram illustrating an example of a first state of data stored in an association data storage unit, according to an embodiment.

FIG. 7 is a diagram illustrating an example of a second state of data stored in an association data storage unit, according to an embodiment.

FIG. 9 is a diagram illustrating an example of a third state of data stored in an association data storage unit, according to an embodiment.

FIG. 12 is a diagram illustrating an example of data stored in an external communication data storage unit, according to an embodiment.

FIG. 16 is a diagram illustrating an example of data to be stored in an assumed sequence storage unit, according to an embodiment.

FIG. 18 is a diagram illustrating an example of a first state of data stored in an association data storage unit, according to an embodiment.

FIG. 21 is a diagram illustrating an example of a second state of data stored in an association data storage unit, according to an embodiment.

DESCRIPTION OF EMBODIMENTS

One aspect of embodiments intends to provide a technology that detects an attack of terminals using a terminal infected with a remote-controlled type malware as a steppingstone.

Embodiment 1

Figure 1:
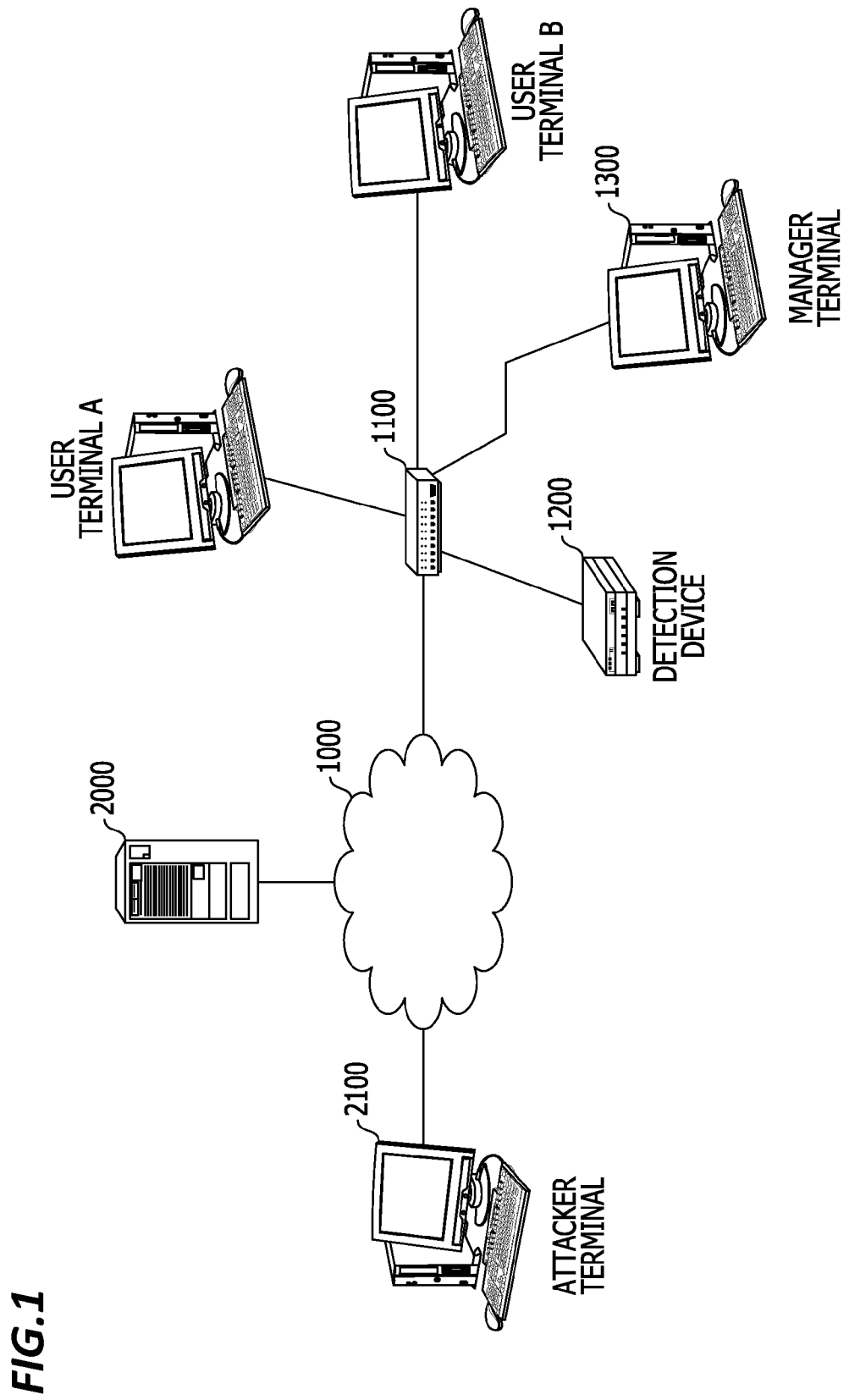
FIG. 1 is a diagram illustrating an example of a system, according to an embodiment.

An overview of a system according to an embodiment will be described with reference to FIG. 1. As illustrated in FIG. 1, various servers 2000, an attacker terminal 2100 manipulated by an attacker and a communication device 1100, such as a router in an enterprise, are connected to the Internet 1000. Devices such as a detection device 1200, a plurality of user terminals including a user terminal A, a user terminal B and a manager terminal 1300 or a server are connected to the communication device 1100. Further, the communication device 1100 outputs communication data (e.g., data packets) flowing through the communication device 1100 to the detection device 1200 in a packet mirroring.

Figure 2:
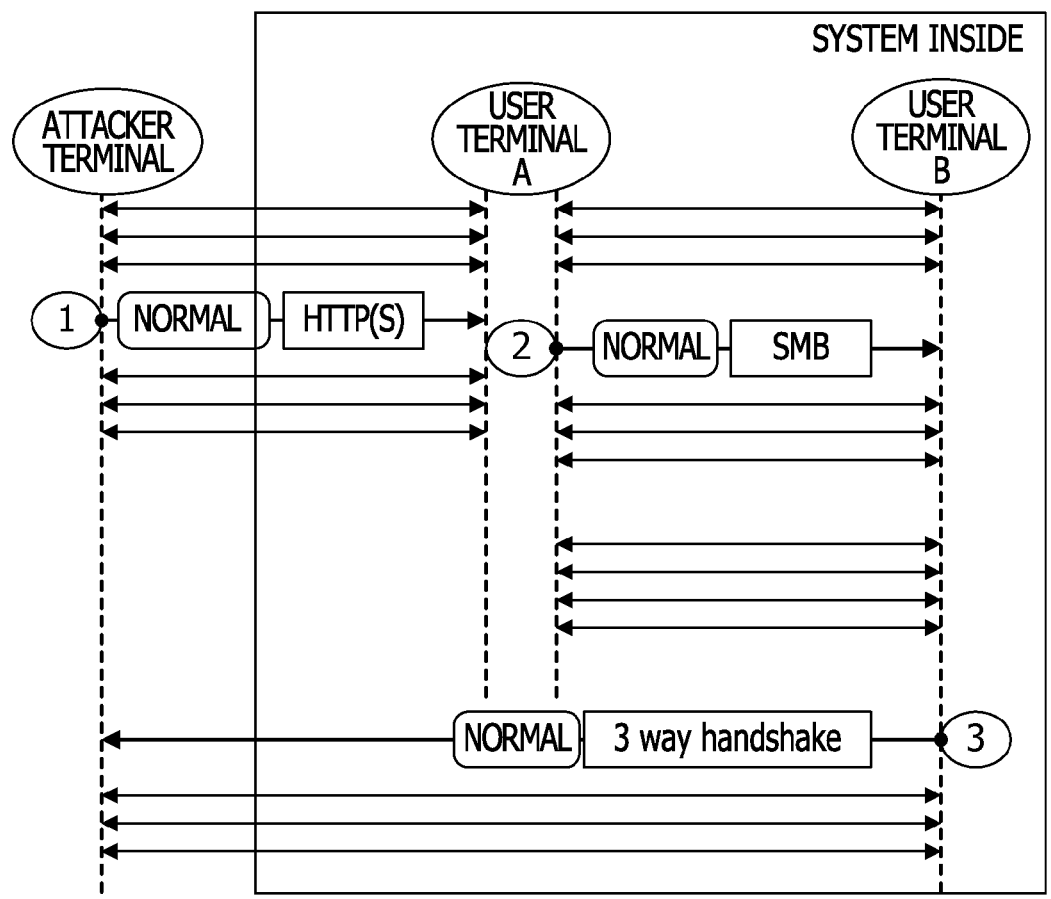
FIG. 2 is a diagram illustrating an example of an operational sequence in a computer network, according to an embodiment.

In a case where a targeted user terminal is attacked to be infected with remote-controlled malware via a steppingstone, the communication as illustrated in FIG. 2 occurs among the attacker terminal 2100, the user terminal A which becomes a steppingstone for an attack, and the user terminal B which is a target of an attack. First, a communication (1) loaded with data which serves as an instruction for an attack occurs from the attacker terminal 2100 to the user terminal A (an external communication (1)). The communication may be conducted using, for example, HTTP (Hyper Text Transfer Protocol) or HTTPS (Hypertext Transfer Protocol Secure). Next, a communication with which an execution code or program is sent from the user terminal A to the user terminal B to be executed in the user terminal B (a service initiation (2)) occurs. The communication may be conducted over, for example, SMB (Server Message Block). Finally, a communication which sets up a new connection from the user terminal B to the attacker terminal A occurs (an external connection (3)). The sequence to set up the connection is, for example, a three way handshake. Each of the external communication, the service initiation, and the external connection is a normal communication when being determined independently and thus, may not be determined as a communication which attacks the system.

Figure 3:
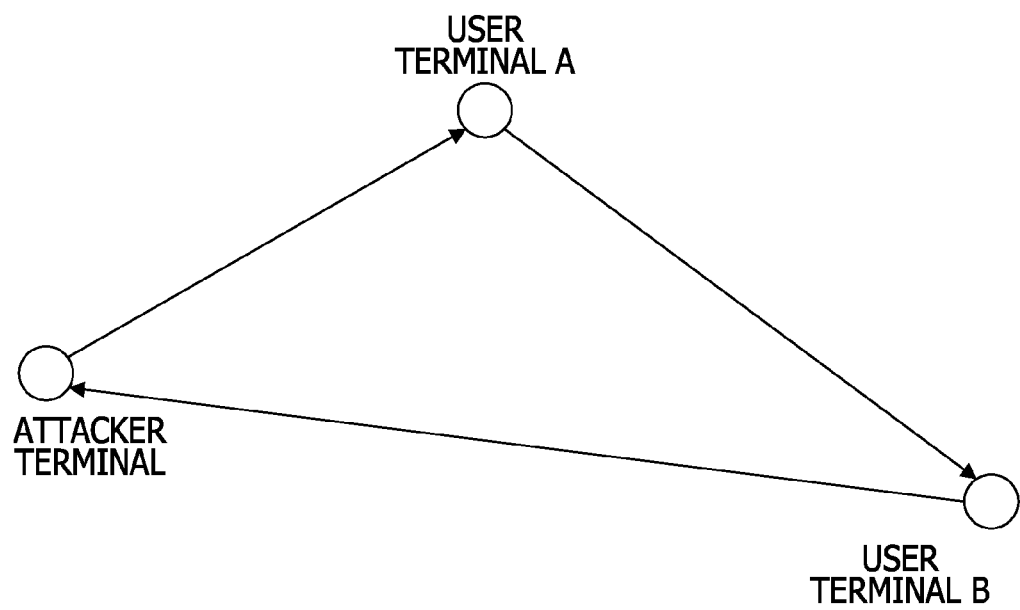
FIG. 3 is a schematic diagram illustrating a viewpoint for detecting an attack, according to an embodiment.

Therefore, in the embodiment as illustrated in FIG. 3, a closed loop is detected based on a fact that the closed loop is formed with the external communication from the attacker terminal 2100 to the user terminal A, the service initiation communication from the user terminal A to the user terminal B and the external connection from the user terminal B to the attacker terminal 2100, as illustrated in FIG. 3.

Figure 4:
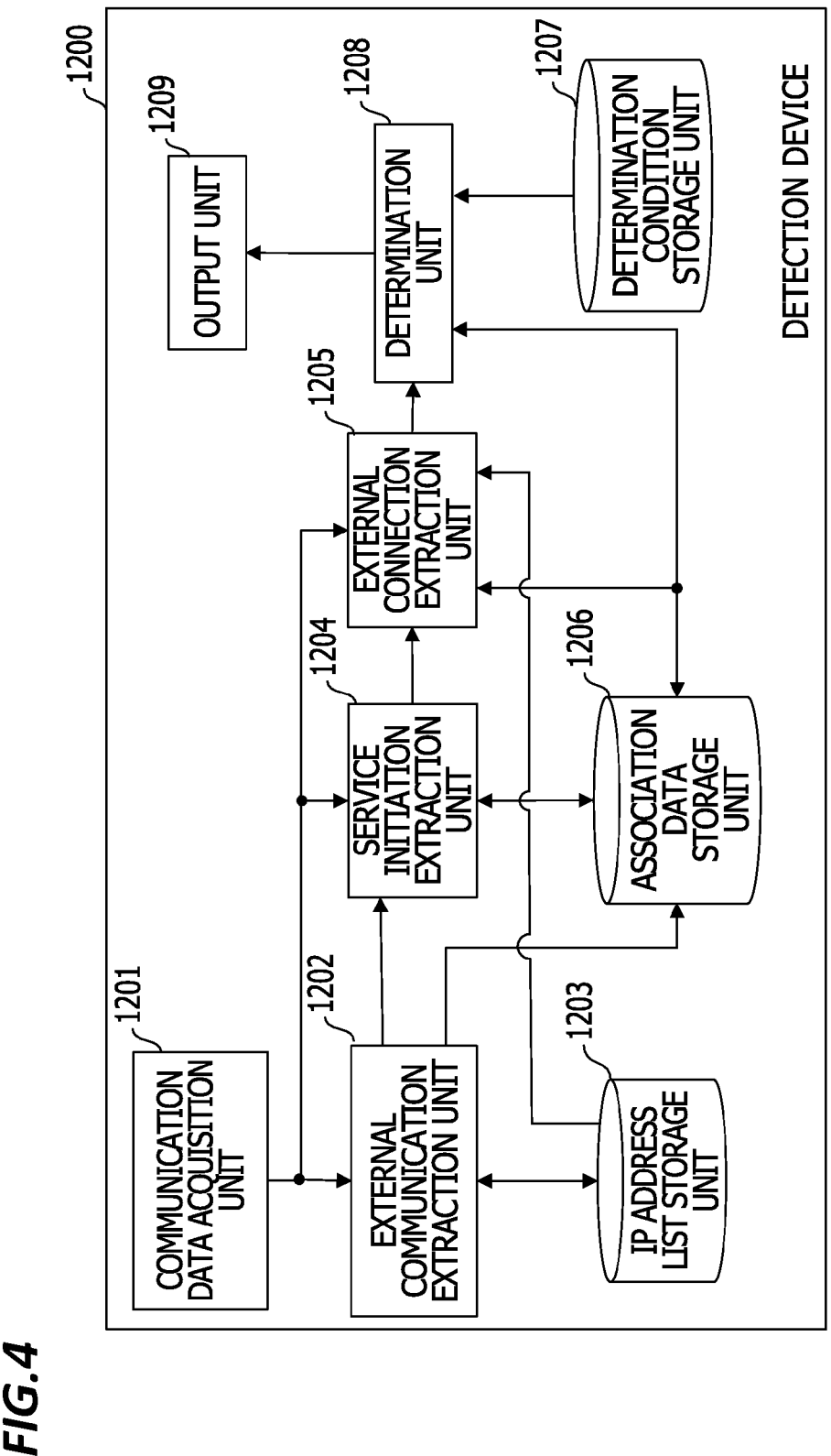
FIG. 4 is a diagram illustrating an example of a configuration of a detection device, according to an embodiment.
Figure 5B:
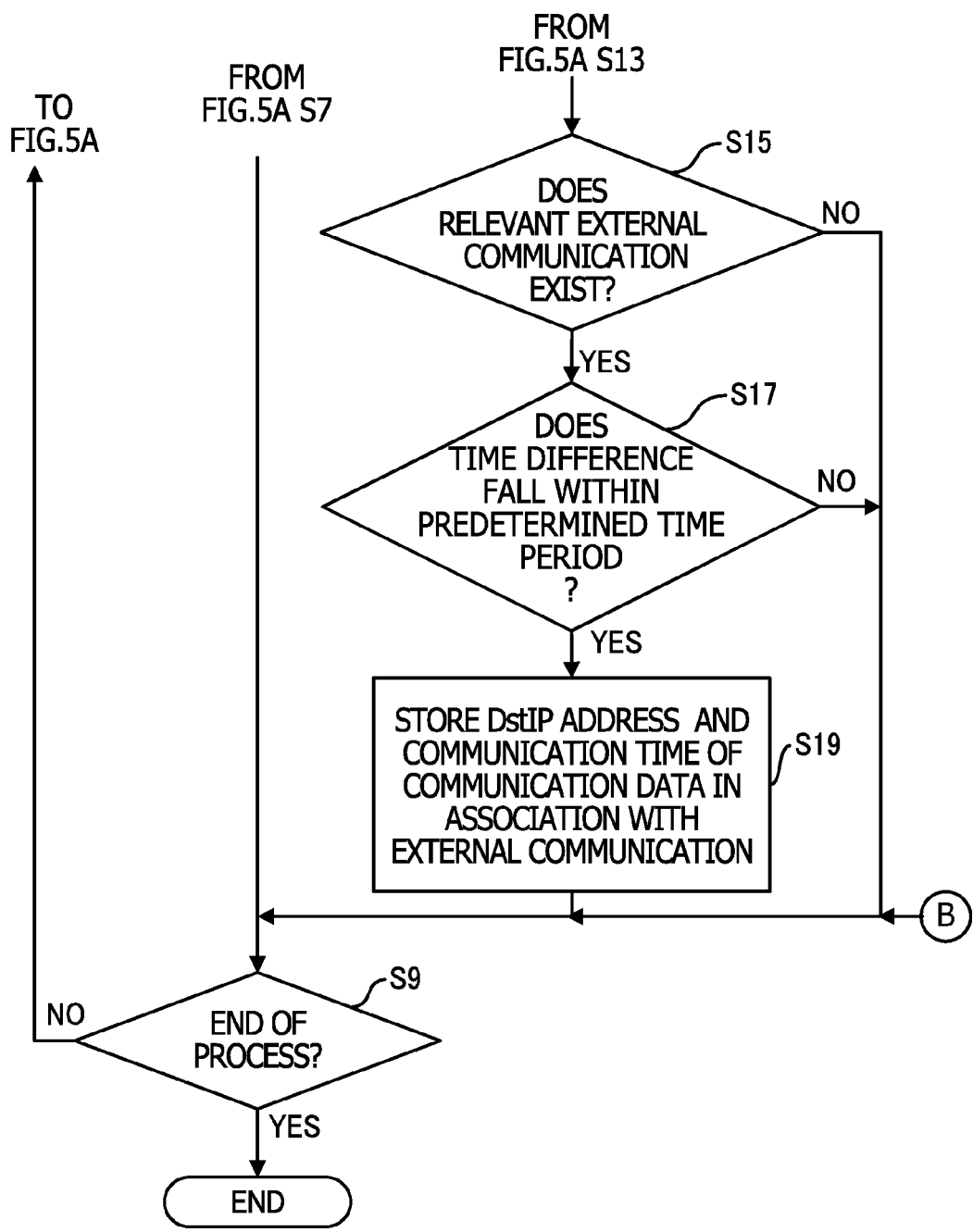
Figure 8:
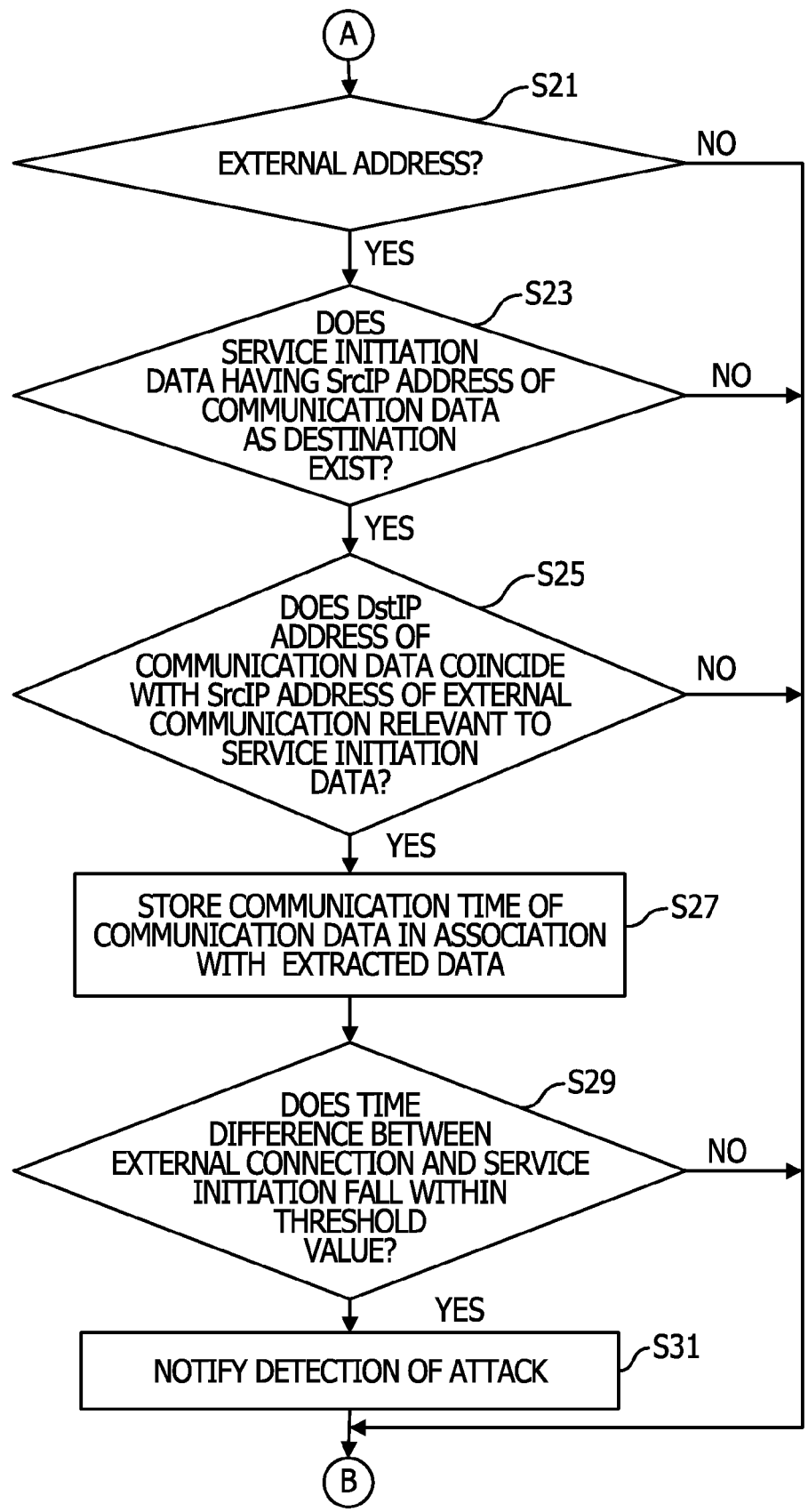
FIG. 8 is a diagram illustrating an example of an operational flowchart, according to an embodiment.

Accordingly, the detection device 1200 according to the embodiment has a configuration as illustrated in FIG. 4. That is, the detection device 1200 includes a communication data acquisition unit 1201, an external communication extraction unit 1202, a service initiation extraction unit 1204, an external connection extraction unit 1205, an IP address list storage unit 1203, an association data storage unit 1206, a determination condition storage unit 1207, a determination unit 1208, and an output unit 1209.

The communication data acquisition unit 1201 receives communication data from the communication device 1100. The IP address list storage unit 1203 stores a list of IP addresses of devices within the system. The external communication extraction unit 1202 determines whether the communication data from the communication data acquisition unit 1201 corresponds to the external communication based on the list of IP addresses stored in the IP address list storage unit 1203. When the communication data corresponds to the external communication, the external communication extraction unit 1202 stores external communication data in the association data storage unit 1206.

The service initiation extraction unit 1204 determines whether the communication data from the communication data acquisition unit 1201 corresponds to the service initiation, and further extracts an associated external communication data from the association data storage unit 1206 to store service initiation data in the association data storage unit 1206 by associating the service initiation data with the external communication data.

The external connection extraction unit 1205 determines whether the communication data from the communication data acquisition unit 1201 corresponds to the external connection. When it is determined that the communication data corresponds to an external connection, the external connection extraction unit 1205 extracts the external communication data and the service initiation data associated with the external connection from the association data storage unit 1206. The determination unit 1208 determines whether the extracted data satisfies a determination condition stored in the determination condition storage unit 1207. When it is determined that the extracted data satisfies the determination condition, the determination unit 1208 causes the output unit 1209 to transmit attack detection notification to the manager terminal 1300.

Next, the contents of a process performed by of the detection device 1200 will be described with reference to FIG. 5A to FIG. 9. When the communication data is acquired from the communication device 1100 (step S1 of FIG. 5A), the communication data acquisition unit 1201 outputs the communication data to the external communication extraction unit 1202, the service initiation extraction unit 1204 and the external connection extraction unit 1205.

In contrast, when the communication data is received, the external communication extraction unit 1202 determines whether communication regarding the communication data corresponds to the external communication. Therefore, the external communication extraction unit 1202 determines whether the transmission source IP address (SrcIP address) of the communication data is an address that does not belong to the list of IP addresses stored in the IP address list storage unit 1203, that is, the transmission source IP address (SrcIP address) is an IP address of the device external to the system (step S3). When it is determined that the condition described at step S3 is not satisfied, the external communication extraction unit 1202 instructs the service initiation extraction unit 1204 to perform the process. The communication data includes packet data and, for example, a reception time (also will be called communication time) at which the communication device 1100 or the detection device 1200 has received the packet.

When it is determined that the transmission source IP address of the communication data is the IP address of a device external to the system, the external communication extraction unit 1202 determines whether the received communication data is communication data regarding the HTTP or HTTPS communication (step S5). The external communication extraction unit 1202 determines whether a TCP transmission source port number is the number "80", "8043" or "443". When it is determined that the condition described at step S5 is not satisfied, the external communication extraction unit 1202 instructs the service initiation extraction unit 1204 to perform the process.

When it is determined that the received communication data is communication data regarding the HTTP or HTTPS communication, the received communication data is an external communication to be noted. Therefore, the external communication extraction unit 1202 stores a transmission source IP address (SrcIP address), a transmission destination IP address (DstIP address), and the communication time of the communication data in the association data storage unit 1206 (step S7). Further, when the external communication to be noted is detected, the external communication extraction unit 1202 causes the service initiation extraction unit 1204 and the external connection extraction unit 1205 to discard the communication data received at this time.

For example, information as illustrated in FIG. 6 is stored in the association data storage unit 1206. In the example of FIG. 6, the external communication data including the transmission source IP address, the transmission destination IP address, and the communication time, the service initiation data including the transmission destination IP address and the communication time, and the external connection data including the communication time are stored in association with one another. In this example, it is assumed that the IP address of the attacker terminal 2100 is "100.100.1.1", the IP address of the user terminal A is "192.168.0.2", and the communication time is "8:50:0.000".

Thereafter, for example, the communication data acquisition unit 1201 determines whether an instruction to end the process is made (step S9). When it is determined that the instruction to end the process is not made, the process goes back to step S1. Otherwise, when the instruction to end the process is made, the communication data acquisition unit 1201 ends the process.

In the meantime, when the instruction to perform the process is received from the external communication extraction unit 1202 (the determination result at step S3 or step S5 is "NO"), the service initiation extraction unit 1204 determines whether the received communication data is a communication data regarding the SMB communication and a SMB command included in the communication data is a predetermined command regarding the service initiation, such as Trans Request (step S11). When it is determined that the condition described at step S11 is not satisfied, the service initiation extraction unit 1204 instructs the external connection extraction unit 1205 to perform the process. The process proceeds to a process of FIG. 8 through an encircled symbol A.

When it is determined that the received communication data is the communication data regarding SMB communication and the SMB command included in the communication data is the predetermined command regarding the service initiation, such as Trans Request, the service initiation extraction unit 1204 determines whether the higher layer protocol of the SMB of the communication data is DCE/RPC (Distributed Computing Environment/Remote Procedure Calls) and an option within a DCE/RPC header is StartServiceW (step S13). That is, specifically, the service initiation extraction unit 1204 determines whether the service initiation is to be performed. When it is determined that the condition described at step S13 is not satisfied, the service initiation extraction unit 1204 also instructs the external connection extraction unit 1205 to perform the process. The process proceeds to the process of FIG. 8 through the encircled symbol A.

When it is determined that the higher layer protocol of the SMB of the communication data is the DCE/RPC and the option within the DCE/RPC header is StartServiceW, the service initiation extraction unit 1204 determines whether the external communication data that has the transmission source IP address (SrcIP address) of the communication data as a destination address is stored in the association data storage unit 1206 (step S15). Further, when the service initiation is detected, the service initiation extraction unit 1204 causes the external connection extraction unit 1205 to discard the communication data received at this time.

The external communication data having the transmission source IP address (SrcIP address) of the communication data as the destination address is specified by backward searching pieces of the external communication data stored in the association data storage unit 1206 from the communication time of the received communication data.

When the external communication data having the transmission source IP address (SrcIP address) of the communication data as the destination address may not be extracted from the association data storage unit 1206, the process proceeds to step S9.

In the meantime, when the external communication data having the transmission source IP address (SrcIP address) of the communication data as the destination address is extracted, the service initiation extraction unit 1204 determines whether a time difference between the communication time of the extracted external communication data and the communication time of the received communication data falls within a predetermined time period (e.g., within 100 ms) (step S17). When a plurality of records regarding the external communication data is extracted, the determination for the time difference is performed on each record at step S17.

When it is determined that the time difference between the communication time of the extracted external communication data and the communication time of the received communication data does not fall within the predetermined time period, the extracted external communication data and the received communication data are regarded as non relevant, and the process proceeds to step S9.

In the meantime, when it is determined that the time difference between the communication time of the extracted external communication data and the communication time of the received communication data falls within the predetermined time period, it is considered that the external communication data relevant to the received communication data is extracted. Accordingly, the service initiation extraction unit 1204 stores, in the association data storage unit 1206, the service initiation data including the transmission destination IP address (DstIP address) and the communication time of the received communication data in association with the extracted external communication data (step S19). Thereafter, the process proceeds to step S9.

For example, data as illustrated in FIG. 7 is stored in the association data storage unit 1206. In the example of FIG. 7, the transmission destination IP address of the received communication data is "192.168.0.3" and thus, the transmission destination IP address "192.168.0.3" of the received communication data and the communication time "8:50:0.050" are stored as the service initiation data.

Upon receiving the instruction to perform the process from the service initiation extraction unit 1204, the external connection extraction unit 1205 determines whether the transmission source IP address (SrcIP address) of the received communication data is an address that is not included in the list of IP addresses of the devices within the system stored in the IP address list storage unit 1203, that is, the transmission source IP address (SrcIP address) is an IP address of a device external to the system (step S21). When it is determined that the condition described at step S21 is not satisfied, the process goes back to step S9 of FIG. 5B through an encircled symbol B.

In the meantime, when the transmission destination IP address (DstIP address) of the received communication data is an IP address of the external device, the external connection extraction unit 1205 determines whether the service initiation data having the transmission source IP address (SrcIP address) of the received communication data as a destination address exists in the association data storage unit 1206 (step S23). For example, the external connection extraction unit 1205 retrieves the service initiation data which includes the transmission source IP address of the received communication data as the transmission destination IP address which is "192.168.0.3". When the service initiation data which satisfies the condition described at step S23 does not exist, the process goes back to step S9 of FIG. 5B through the encircled symbol B.

In the meantime, when it is determined the service initiation data having the transmission source IP address (SrcIP address) of the received communication data as a destination address exists in the association data storage unit 1206, the external connection extraction unit 1205 determines whether the transmission destination IP address of the received communication data is coincident with the transmission source IP address in the external communication data associated with the extracted service initiation data (step S25). Further, when a plurality of records of the service initiation data is extracted, the determination for coincidence of addresses (of step S25) is performed on each record. When the transmission destination IP address of the received communication data is "100.100.1.1", the record illustrated in FIG. 7 satisfies the determination condition of step S25. When it is determined that the determination condition of step S25 is not satisfied, the process goes back to step S9 of FIG. 5B through the encircled symbol B.

In the meantime, when it is determined that the transmission destination IP address of the received communication data is coincident with the transmission source IP address in the external communication data associated with the extracted service initiation data, the external connection extraction unit 1205 stores, in the association data storage unit 1206, the communication time of the communication data in association with the service initiation data and the external communication data that are extracted by the process described above (step S27).

For example, data as illustrated in FIG. 9 is stored in the association data storage unit 1206. In the example of FIG. 9, the communication time "8:50:0.100" of the communication data regarding the external connection data is additionally registered.

Then, the external connection extraction unit 1205 instructs the determination unit 1208 to perform a determination process on a record of which communication time is stored in the association data storage unit 1206.

The determination unit 1208 determines whether a difference between the communication time of the external connection data and the communication time of the service initiation data satisfies a determination condition including a condition that a time difference falls within a threshold time period, based on a threshold time period (e.g., 50 ms) which is a determination condition stored in the determination condition storage unit 1207 (step S29). Further, the determination unit 1208 may determine the time difference between the communication time of the external communication data and the communication time of the service initiation data, instead of or in addition to the communication time of the external connection data. Further, the determination unit 1208 may determine whether the transmission source IP address or the transmission destination IP address of the external communication and the transmission destination IP address of the service initiation are coincident with a white list (e.g., IP address of a safe external server (e.g., the server 2000) or a manager terminal 1300) prescribed in the determination condition storage unit 1207. When it is determined that the IP addresses are coincident with the white list, it is determined that the determination is not satisfied. When it is determined that the condition described at step S29 is not satisfied, the process goes back to step S9 of FIG. 5B through the encircled symbol B.

In the meantime, when it is determined that the difference between the communication time of the external connection data and the communication time of the service initiation data satisfies the determination condition including a condition that a time difference falls within the threshold time period, the determination unit 1208 instructs the output unit 1209 to transmit an attack detection message including the external communication data, the service initiation data, and the external connection data that satisfy the determination condition, to the manager terminal 1300 (step S31). Then, the process goes back to step S9 of FIG. 5B through the encircled symbol B.

As described above, with respect to an attack which infects the targeted user terminal (user terminal B) with remote-controlled type malware via the steppingstone (user terminal A), relevant communications such as the external communication and the service initiation or the service initiation and the external connection may be extracted to respond to the attack, thereby enabling to detect a series of communications as an attack. Especially, it becomes possible to respond to malware for which a pattern of communication data is not prepared.

Embodiment 2

A multitude of candidates for combinations of the external communication and the service initiation may exist in the communication for a normal work. Therefore, it is preferable to narrow the range of the candidate combinations from a viewpoint of a processing load or an accuracy. Since the remote-controlled type malware has a feature that creates and maintains the communication connection to implement a real-time remote control, modification to the first embodiment is made based on this feature.

Figure 10:
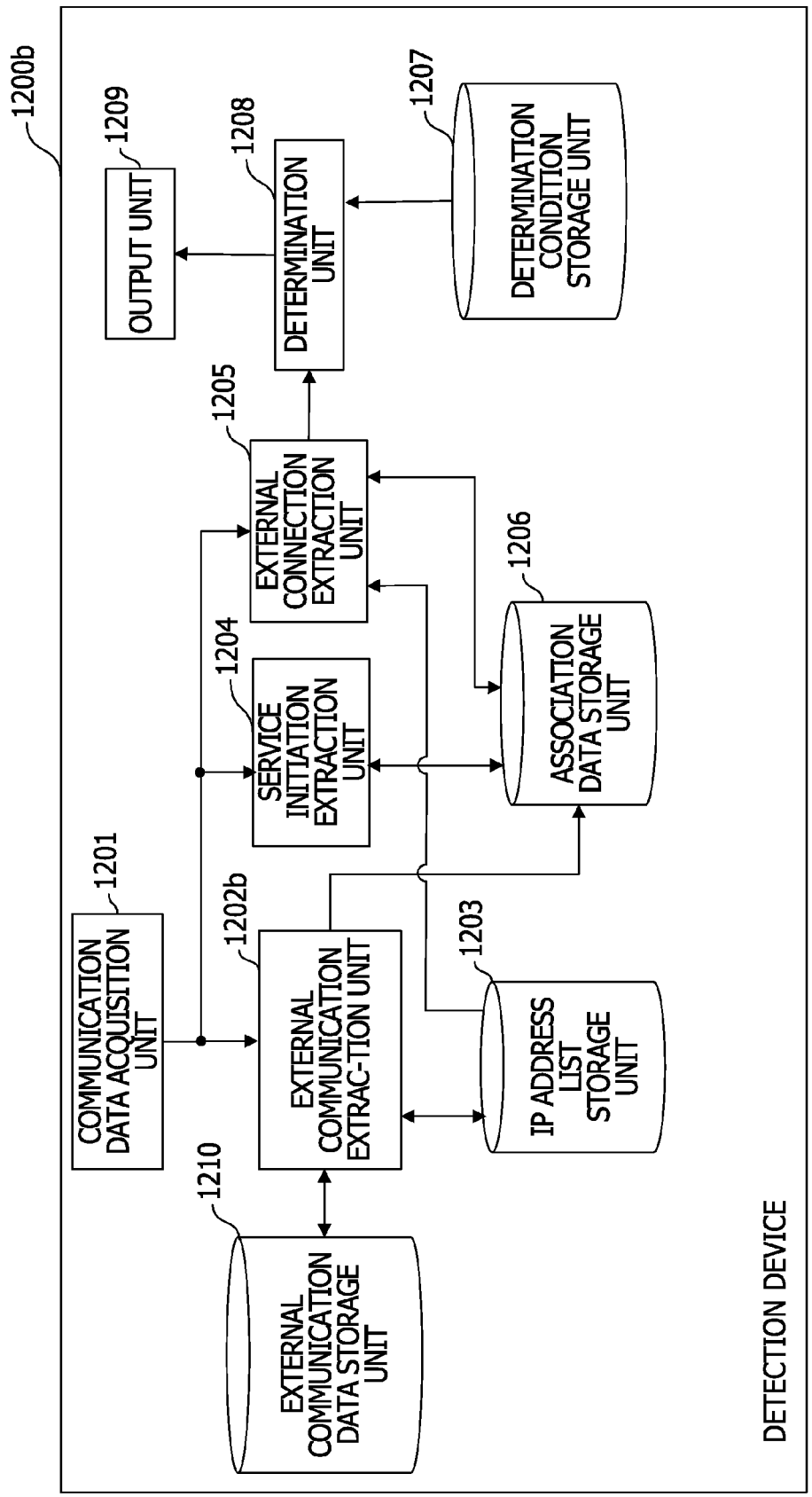
FIG. 10 is a diagram illustrating an example of a configuration of a detection device, according to an embodiment.

FIG. 10 is a diagram illustrating an example of a configuration of a detection device, according to an embodiment. The detection device 1200b includes the communication data acquisition unit 1201, an external communication extraction unit 1202b, the IP address list storage unit 1203, the service initiation extraction unit 1204, the external connection extraction unit 1205, the association data storage unit 1206, the determination condition storage unit 1207, the determination unit 1208, the output unit 1209, and an external communication data storage unit 1210. The same constitutional elements as those of the first embodiment are denoted by the same reference numerals.

The external communication extraction unit 1202b holds data for determining the duration of the connection in the external communication data storage unit 1210, determines whether the duration of the connection exceeds a threshold value, and stores the external communication data in the association data storage unit 1206.

Subsequently, the contents of a process according to a second embodiment will be described with reference to FIG. 11 to FIG. 13.

First, when the communication data is acquired from the communication device 1100 (step S41 of FIG. 11), the communication data acquisition unit 1201 outputs the communication data to the external communication extraction unit 1202b, the service initiation extraction unit 1204, and the external connection extraction unit 1205.

Upon receiving communication data, the external communication extraction unit 1202 determines whether communication regarding the communication data corresponds to the external communication (step S43). Step S43 is similar to step S3 and step S5. When it is determined that the condition described at step S43 is not satisfied, the external communication extraction unit 1202 instructs the service initiation extraction unit 1204 to perform the process. That is, the process proceeds to step S57.

In the meantime, when the received communication data corresponds to the external communication, the external communication extraction unit 1202b retrieves data of the same connection as that of the received communication data in the external communication data storage unit 1210 (step S45). Initially, since no data is stored in the external communication data storage unit 1210, no data is detected. Further, upon detecting the external communication, the external communication extraction unit 1202b causes the service initiation extraction unit 1204 and the external connection extraction unit 1205 to discard the communication data received at this time.

Also, the external communication extraction unit 1202b determines whether the data of the same connection as that of the received communication data is detected (step S47). Since there is no detection at the first time, the external communication extraction unit 1202b stores the received communication data, that is, the transmission source IP address (SrcIP address) and the transmission destination IP address (DstIP address), the transmission source TCP port number and the transmission destination TCP port number, and an initiation time (the communication time of the received communication data) of the external communication, in the external communication data storage unit 1210 (step S49). Then, for example, data as illustrated in FIG. 12 is stored in the external communication data storage unit 1210. In the example of FIG. 12, the transmission source IP address, the transmission source TCP port number, the transmission destination IP address, the transmission destination TCP port number, and the initiation time are stored as the connection data. The process then proceeds to step S55.

In the meantime, when it is determined that the data of the same connection as that of the received communication data is detected, the external communication extraction unit 1202b determines whether the duration of connection which is a difference between the communication time of the received communication data and the initiation time included in the connection data stored in the external communication data storage unit 1210 is equal to or greater than a predetermined value (step S51). When it is determined that the duration of connection is less than the predetermined value, the external communication data is not stored in the association data storage unit 1206 in the embodiment and thus, the process proceeds to step S55.

In the meantime, when it is determined that the duration of connection is equal to or greater than the predetermined value, the received communication data is an external communication to be noted and thus, the external communication extraction unit 1202b stores the transmission source IP address (SrcIP address), the transmission destination IP address (DstIP address), and the communication time of the communication data, in the association data storage unit 1206 (step S53). For example, data as illustrated in FIG. 6 is stored in the association data storage unit 1206.

Thereafter, for example, the communication data acquisition unit 1201 determines whether there is an instruction to end the process (step S55). When it is determined that there is no instruction to end the process, the process goes back to step S41. Otherwise, when there is an instruction to end the process, the communication data acquisition unit 1201 ends the process.

In the meantime, when the service initiation extraction unit 1204 is instructed from the external communication extraction unit 1202b (the determination result at step S43 is "NO") to perform the process, the service initiation extraction unit 1204 determines whether the received communication data is the communication data regarding the service initiation (step S57). Step 57 is similar to step S11 and S13 in the first embodiment. When it is determined that the condition described at step S57 is not satisfied, the service initiation extraction unit 1204 instructs the external connection extraction unit 1205 to perform the process. The process then proceeds to a process of FIG. 13 through an encircled symbol C.

In the meantime, when it is determined that the received communication data is the communication data regarding the service initiation, the service initiation extraction unit 1204 search the association data storage unit 1206 for the external communication data relevant to the communication data, that is, the external communication data having the transmission source IP address (SrcIP address) of the communication data as a destination address in (step S59). Further, a condition that the difference of communication times between the relevant external communication data and the received communication data falls within a predetermined time period (e.g., within 100 ms) may be added to a search condition of the relevant external communication data. Further, upon detecting the service initiation, the service initiation extraction unit 1204 causes the external connection extraction unit 1205 to discard the communication data received at this time.

The service initiation extraction unit 1204 determines whether the external communication data relevant to the communication data is extracted (step S61). When it is determined that the external communication data relevant to the communication data is not extracted, the process proceeds to step S55.

In the meantime, when it is determined that the external communication data relevant to the communication data is extracted, the service initiation extraction unit 1204 stores, in the association data storage unit 1206, the service initiation data including the transmission destination IP address (DstIP address) and the communication time of the received communication data, in association with the extracted external communication data (step S63). Thereafter, the process proceeds to step S55. For example, data as illustrated in FIG. 7 is stored in the association data storage unit 1206.

Figure 13:
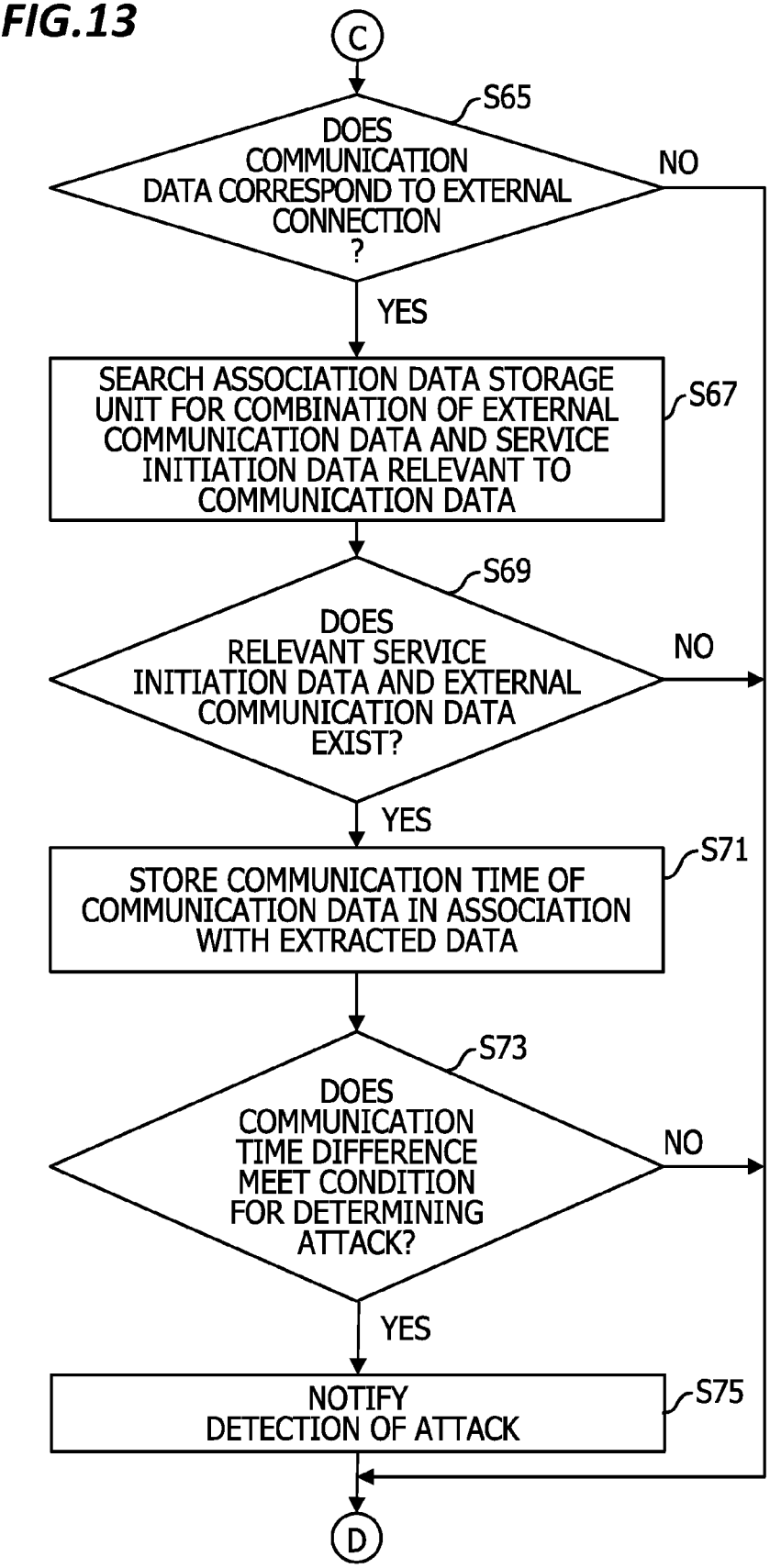
FIG. 13 is a diagram illustrating an example of an operational flowchart, according to an embodiment.

The process proceeds to a step of FIG. 13 continued from the encircled symbol C. When an instruction is received from the service initiation extraction unit 1204, the external connection extraction unit 1205 determines whether the transmission destination IP address (DstIP address) of the received communication data is not included in a list of IP addresses of devices within the system stored in the IP address list storage unit 1203, that is, the received communication data corresponds to the external connection (step S65). When it is determined that the condition described at step S65 is not satisfied, the process goes back to step S55 of FIG. 11 through an encircled symbol D. Further, step S65 is similar to step S21.

In the meantime, when it is determined that the received communication data corresponds to the external connection, the external connection extraction unit 1205 searches the association data storage unit 1206 for a combination of the external communication data and the service initiation data that are relevant to the received communication data (step S67).

More specifically, the external connection extraction unit 1205 extracts the service initiation data having the transmission source IP address (SrcIP address) of the received communication data as a destination address, and the external communication data which is associated with the corresponding service initiation data and having the transmission destination IP address of the received communication data as the transmission source IP address. Step S67 is similar to step S23 and S25.

Figure 11:
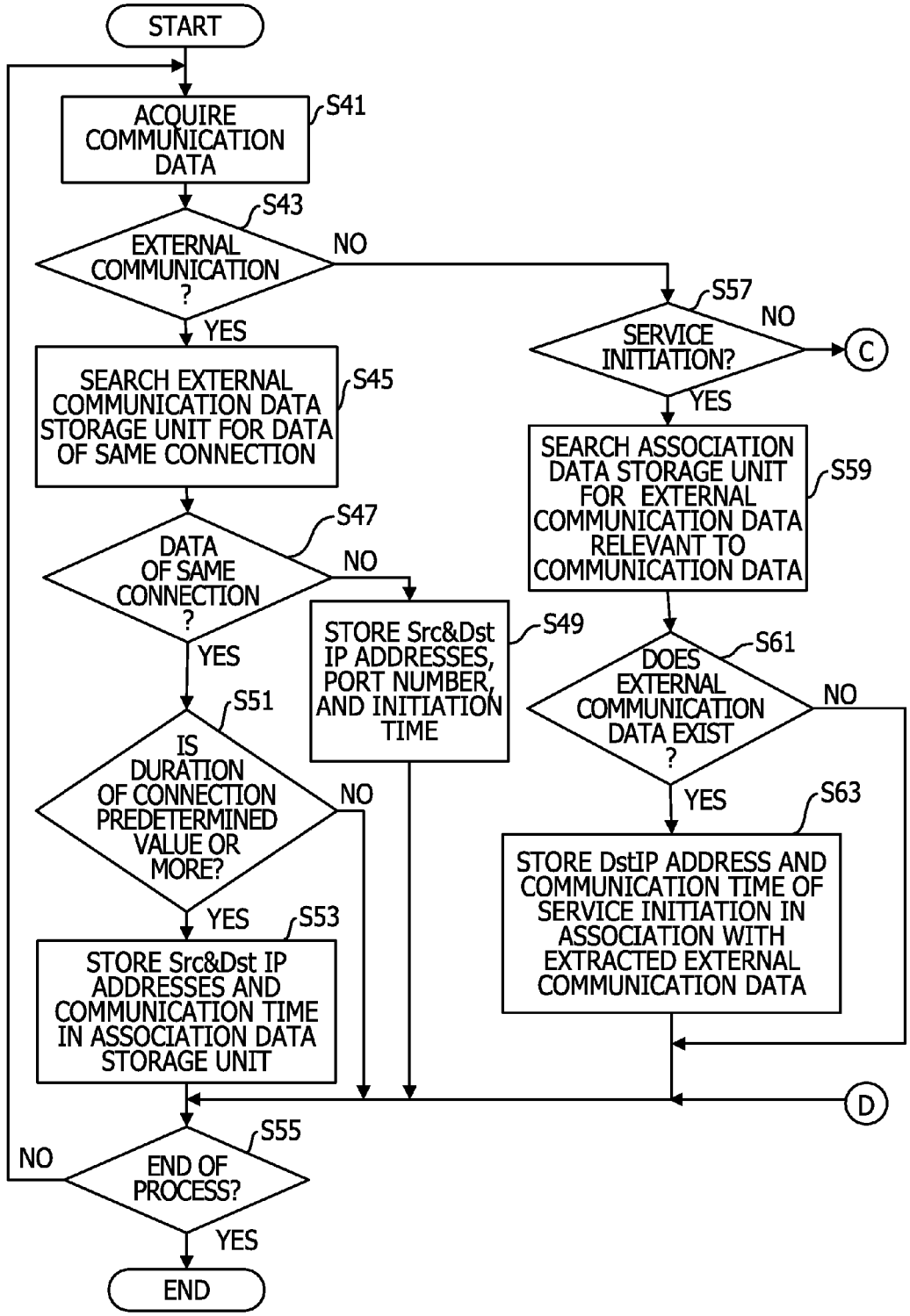
FIG. 11 is a diagram illustrating an example of an operational flowchart, according to an embodiment.

When the combination of the service initiation data and the external communication data that satisfies the condition of the step S67 may not be extracted ("NO" at step S69), the process goes back to step S55 of FIG. 11 through the encircled symbol D.

When the combination of the service initiation data and the external communication data that are relevant to the received communication data is extracted ("YES" at step S69), the external connection extraction unit 1205 stores, in the association data storage unit 1206, the communication time of the communication data in association with the service initiation data and the external communication data that are extracted by the process described above (step S71). For example, data as illustrated in FIG. 9 is stored in the association data storage unit 1206. Step S71 is similar to step S27.

Then, the external connection extraction unit 1205 instructs the determination unit 1208 to perform a determination process on a record of which communication time is stored in the association data storage unit 1206.

The determination unit 1208 determines whether a difference between the communication time of the external connection data and the communication time of the service initiation data meets a determination condition including a condition that a time difference falls within a threshold time period, based on a threshold time period (e.g., 50 ms) which is a determination condition stored in the determination condition storage unit 1207 (step S73). Further, the determination unit 1208 may determine the time difference between the communication time of the service initiation data and the communication time of the external communication data instead of the communication time of the external connection data. Further, the determination unit 1208 may determine whether the transmission source IP address or the transmission destination IP address of the external communication and the transmission destination IP address of the service initiation are coincident with a white list (e.g., IP address of a safe external server (e.g., the server 2000) or a manager terminal 1300) prescribed in the determination condition storage unit 1207. When it is determined that the IP addresses are coincident with the white list, it is determined that the determination condition is not satisfied. Step S73 is similar to step S29. When it is determined that the condition described at step S73 is not satisfied, the process goes back to step S55 of FIG. 11 through the encircled symbol D.

In the meantime, when it is determined that the difference between the communication time of the external connection data and the communication time of the service initiation data satisfies a determination condition including a condition that a time difference falls within a threshold time, the determination unit 1208 instructs the output unit 1209 to transmit an attack detection message including the external communication data, the service initiation data, and the external connection data that satisfy the determination condition, to the manager terminal 1300 (step S75). Step S75 is similar to step S31. The process then goes back to step S55 of FIG. 11 through the encircled symbol D.

As described above, with respect to an attack which infects the targeted user terminal (user terminal B) with the remote-controlled type malware via the steppingstone (user terminal A), relevant communications such as the external communication and the service initiation or the service initiation and the external connection may be extracted to respond to the attack, thereby allowing a series of communications to be detected as an attack.

Further, when the external communication is extracted, an external communication to be extracted may be limited to a connection oriented communication that has the duration time of a predetermined value or more. As a result, communication having a short access period such as, for example, a Web access may be excluded from the external communication candidates, thereby improving an extraction accuracy of attack.

Embodiment 3

Since it is assumed that a multitude of candidates for combinations of the external communication and the service initiation may exist in the communication of a normal work, a problem-free combination of an external communication and service initiation may be selected as a candidate.

In an attack, a service initiation sequence is initiated from the user terminal A which becomes the steppingstone toward the targeted user terminal B immediately after the external communication, and then an actual service initiation occurs on the sequence. In the embodiment, the determination condition for finding a combination of the external communication and the service initiation is not a time difference between the external communication and the service initiation, but the time difference between the external communication and the top of the service initiation sequence. By doing this, candidates for the external communication which are originally non relevant to the service initiation may be excluded.

Figure 14:
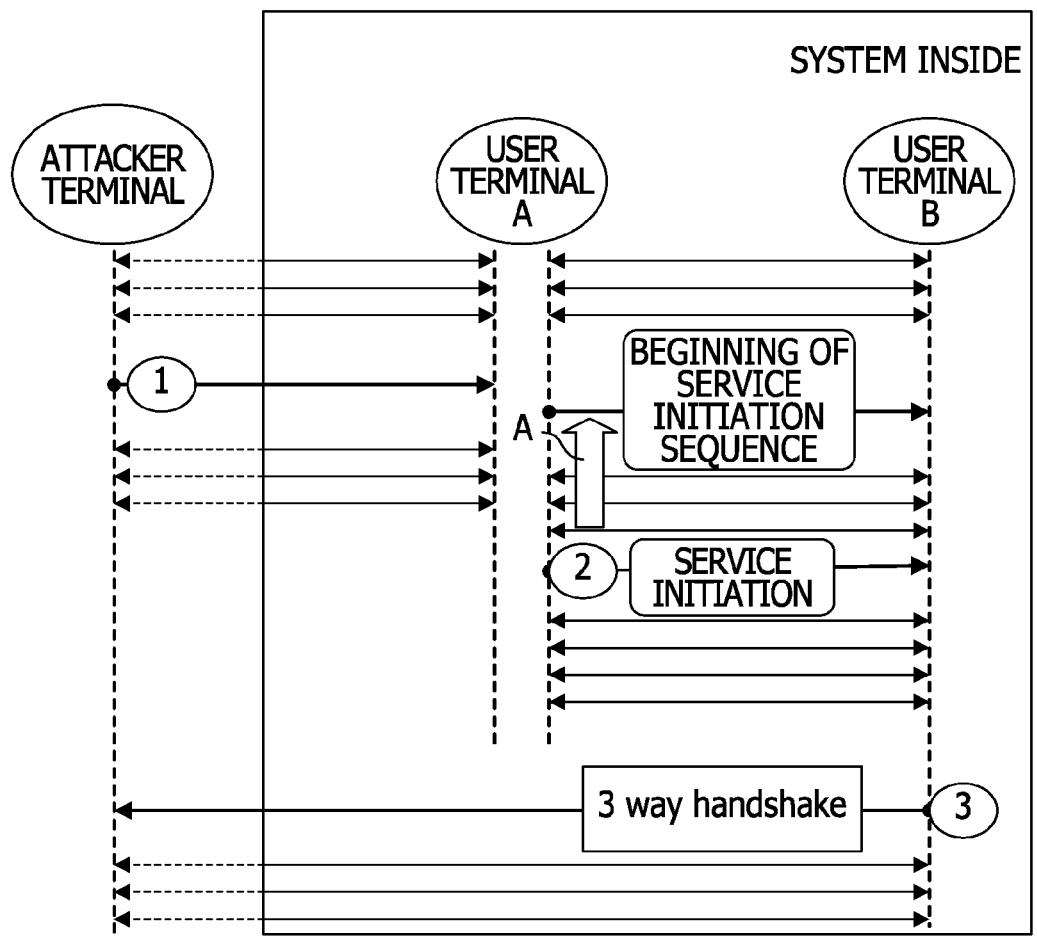
FIG. 14 is a diagram illustrating an example of an operational sequence in a computer network, according to an embodiment.

More specifically, as illustrated in FIG. 14, when the service initiation is extracted, the previous communication data having the same connection as the service initiation and an assumed sequence known in advance are compared and retraced (arrow A). And then, the communication time that conforms finally is regarded as the leading time of the service initiation sequence. Accordingly, it becomes possible to reduce the likelihood of combining a candidate for the external communication, which is originally non relevant to the service initiation, with the service initiation.

Figure 15:
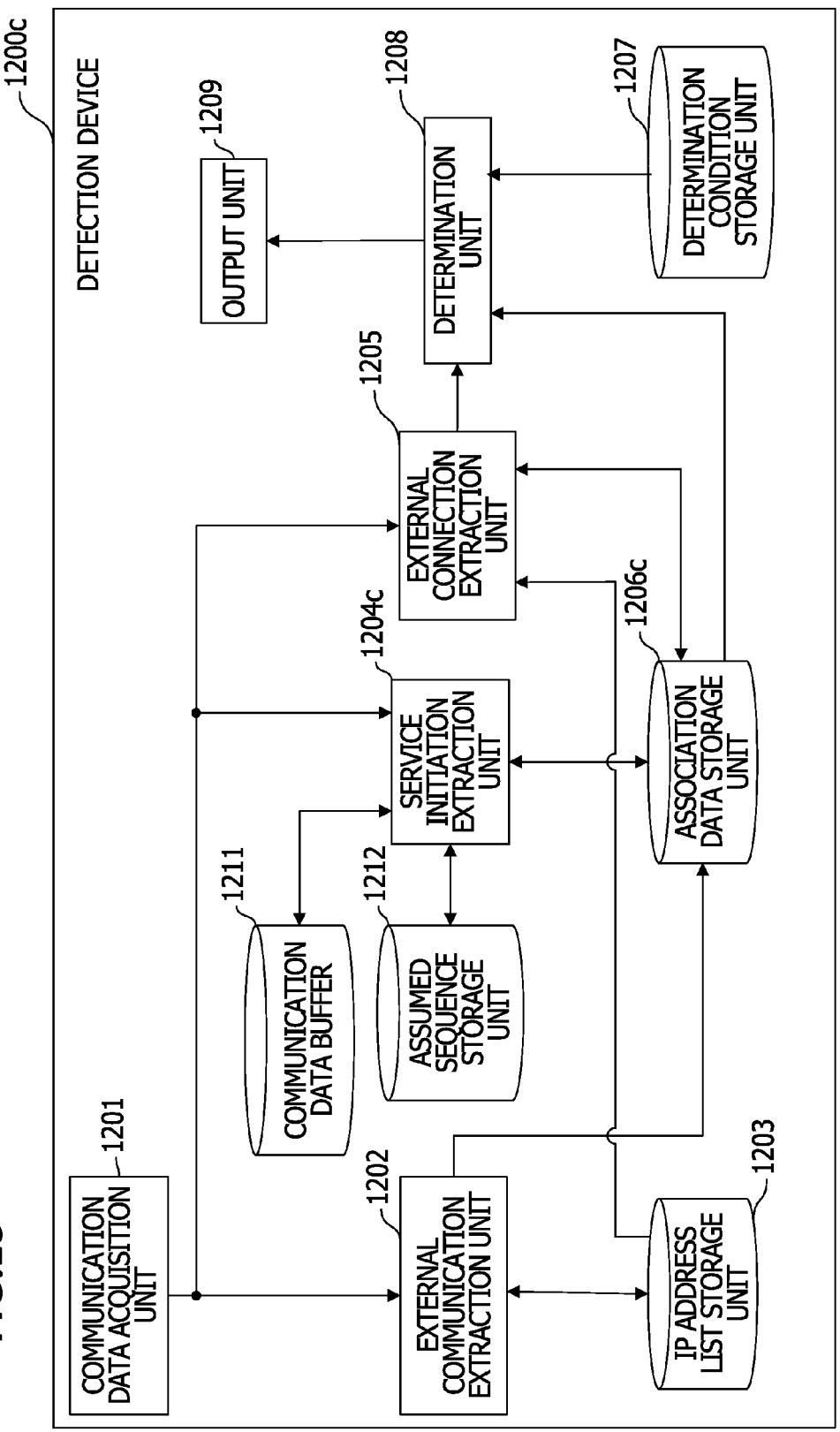
FIG. 15 is a diagram illustrating an example of a configuration of a detection device, according to an embodiment.
Figure 17:
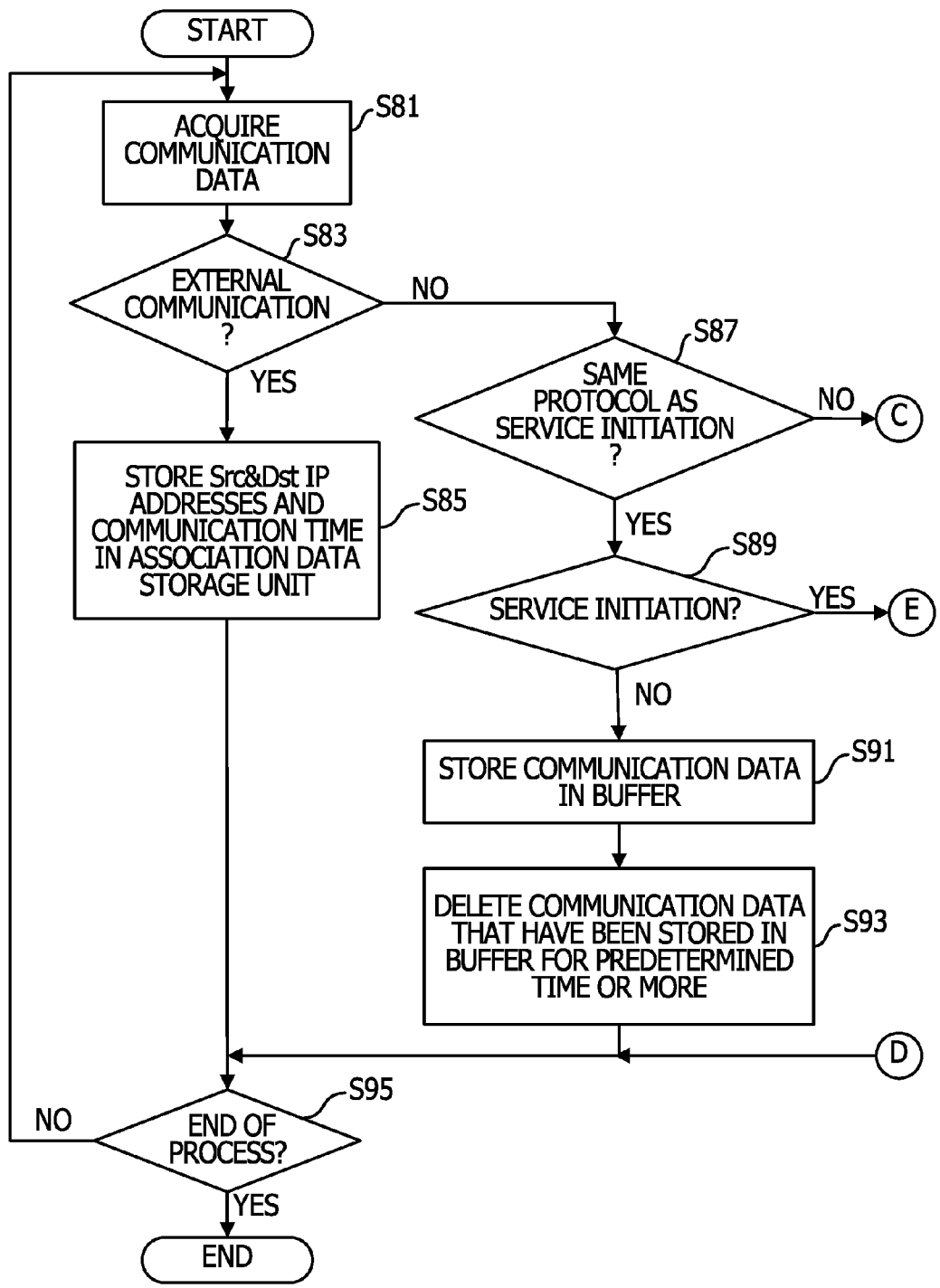
FIG. 17 is a diagram illustrating an example of an operational flowchart, according to an embodiment.

For the reasons set for the above, the detection device 1200c as illustrated in FIG. 15 is employed in the embodiment.

The detection device 1200c according to the embodiment includes the communication data acquisition unit 1201, the external communication extraction unit 1202, the IP address list storage unit 1203, a service initiation extraction unit 1204c, the external connection extraction unit 1205, an association data storage unit 1206c, the determination condition storage unit 1207, the determination unit 1208, the output unit 1209, a communication data buffer 1211, and an assumed sequence storage unit 1212. The same constitutional elements as those of the first embodiment are denoted by the same reference numerals.

The service initiation extraction unit 1204c stores the communication data satisfying the condition indicated below in the communication data buffer 1211 and further, specifies the leading time of the service initiation sequence using data stored in the assumed sequence storage unit 1212.

The data stored in the assumed sequence storage unit 1212 is, for example, data as illustrated in FIG. 16. The example of FIG. 16 illustrates an example of a sequence at the time when a service is initiated by sending a management tool, as a service, to the user terminal B which is a target to be accessed. In general, thereafter, the service receives any program to execute the sequence. Specifically, "3 way handshake" (Establishment of a TCP connection), "Negotiate Protocol" (confirmation of an authentication method), "Session Setup AndX" (authentication procedure), "Tree Connect AndX" (Requesting resources utilized (almost the same as authority)), "NT Create AndX" (Accessing a specified file (preparation for sending service)), "NT Create AndX" (Accessing a specified file (Process of Windows (registered trademark) managing service)), "SVCCTL:CreateServiceW" (Creation of new service), "SVCCTL:OpenServiceW" (Accessing the created service), and "SVCCT:StartServiceW" (Initiation of service) are executed in this order as described. Further, the attributes in FIG. 16 are data relevant to the fourth embodiment and thus, the description thereof will be omitted herein.

Data stored in the association data storage unit 1206c is different from the first embodiment in that the leading time of the service initiation sequence is added to the service initiation data.

Next, the contents of a process according to the third embodiment will be described with reference to FIG. 17 to FIG. 21.

First, when the communication data is acquired from the communication device 1100 (FIG. 17: step S81), the communication data acquisition unit 1201 outputs the communication data to the external communication extraction unit 1202, the service initiation extraction unit 1204c, and the external connection extraction unit 1205.

In response, upon receiving the communication data, the external communication extraction unit 1202 determines whether the communication regarding the communication data corresponds to the external communication (step S83). Step S83 is similar to step S3 and step S5. When it is determined that the condition described at step S83 is not satisfied, the external communication extraction unit 1202 instructs the service initiation extraction unit 1204c to perform the process. That is, the process proceeds to step S87.

In the meantime, when it is determined that the received communication data corresponds to the external communication, the external communication extraction unit 1202 stores the transmission source IP address (SrcIP address), the transmission destination IP address (DstIP address), and the communication time of the communication data, in the association data storage unit 1206c (step S85). Further, when it is determined that communication regarding the communication data corresponds to the external communication, the external communication extraction unit 1202 causes the service initiation extraction unit 1204c and the external connection extraction unit 1205 to discard the communication data received at this time. For example, data as illustrated in FIG. 18 is stored in the association data storage unit 1206c. Though data stored in FIG. 18 is similar to FIG. 6 at step S85, data stored in FIG. 18 is different from FIG. 6 in that the leading time of the service initiation sequence (hereinafter, referred to as a "leading time of the sequence") is additionally stored in the association data storage unit 1206c regarding the service initiation data. Thereafter, for example, the communication data acquisition unit 1201 determines whether there is an instruction to end the process (step S95). When it is determined that there is no instruction to end the process, the process goes back to step S81. Otherwise, when there is an instruction to end the process, the communication data acquisition unit 1201 ends the process.

In the meantime, when the service initiation extraction unit 1204c is instructed to perform the process from the external communication extraction unit 1202 (the determination result at step S83 is "NO"), the service initiation extraction unit 1204c determines whether the received communication data is communication data regarding the same communication protocol as the service initiation (step S87). For example, the service initiation extraction unit 1204c determines whether the communication regarding the communication data is TCP communication having the transmission source port number of "139" or "445" or the transmission destination port number of "139" or "445".

When it is determined that the received communication data is not the communication data regarding the same communication protocol as the service initiation, the process proceeds to a process of FIG. 13 through the encircled symbol C. That is, the service initiation extraction unit 1204c instructs the external connection extraction unit 1205 to perform the process. FIG. 13 is similar to the second embodiment and thus, the descriptions thereof will be omitted.

In the meantime, when it is determined that the received communication data is the communication data regarding the same communication protocol as the service initiation, the service initiation extraction unit 1204c determines whether the received communication data is the communication data regarding the service initiation (step S89). Step S89 is similar to step S11 and S13 in the first embodiment. When it is determined that the condition described at step S89 is satisfied, the process proceeds to a process of FIG. 20 through an encircled symbol E. Further, when the service initiation is detected, the service initiation extraction unit 1204c causes the external connection extraction unit 1205 to discard the communication data received at this time.

Figure 19:
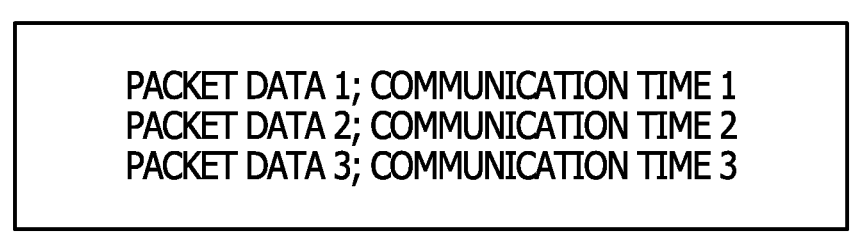
FIG. 19 is a diagram illustrating an example of data stored in a communication data buffer, according to an embodiment.

In the meantime, when it is determined that the received communication data is not the communication data regarding the service initiation, the service initiation extraction unit 1204c stores the communication data along with the communication time in the communication data buffer 1211 in order to afterward perform a process of backward searching the service initiation sequence (step S91). Further, the service initiation extraction unit 1204c deletes the communication data that have been stored for a predetermined time (e.g., 10 (ten) minutes) or more in the communication data buffer 1211, based on the communication time (step S93). Then, the process proceeds to step S95. Further, combinations of the packet data as communication data and the communication time are accumulated in the communication data buffer 1211 as illustrated in FIG. 19.

Figure 20:
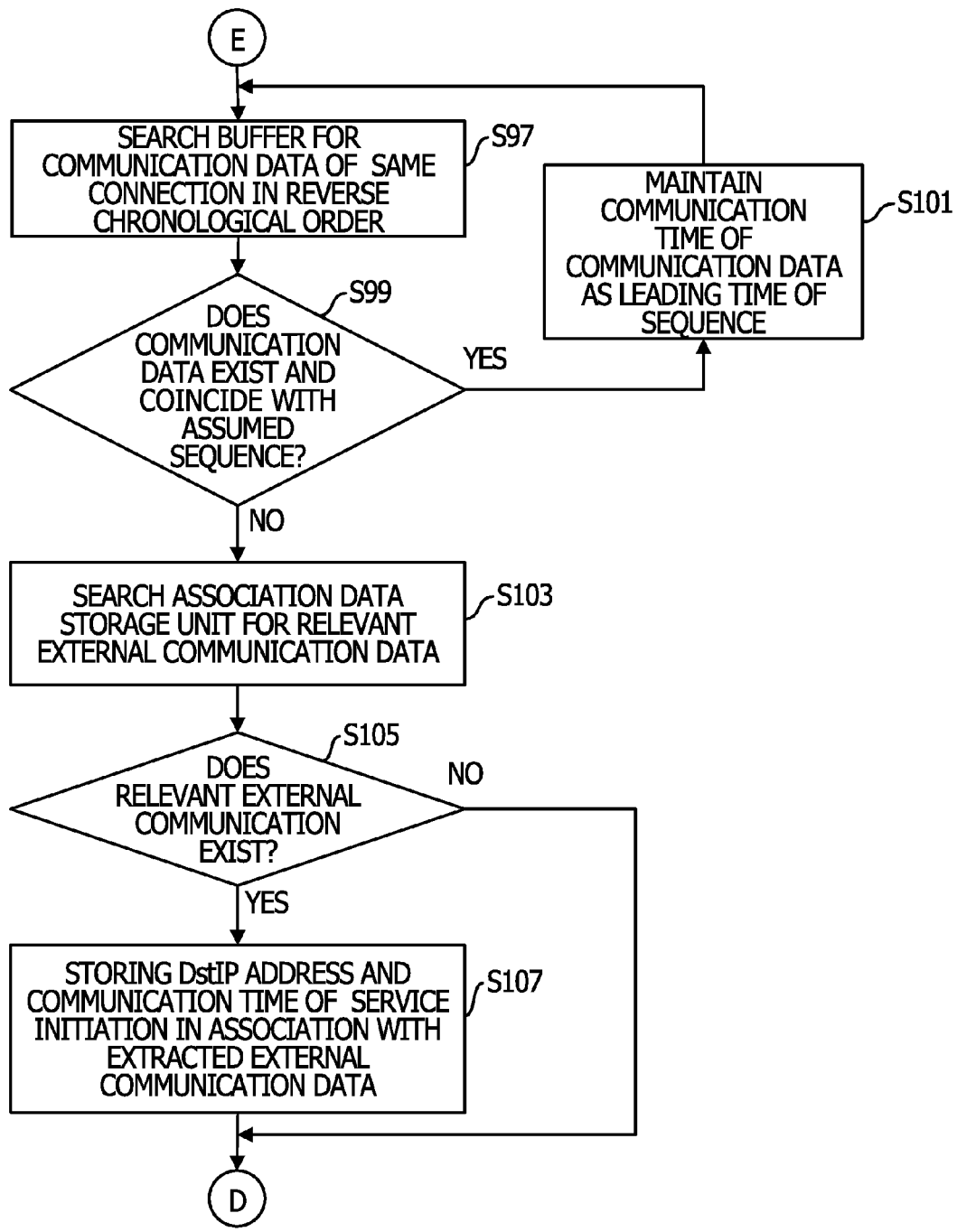
FIG. 20 is a diagram illustrating an example of an operational flowchart, according to an embodiment.

Referring to the description of a process illustrated in FIG. 20, the service initiation extraction unit 1204*c* searches the communication data buffer 1211 for communication data of the same connection, in reverse chronological order of communication times (step S97). For example, the service initiation extraction unit 1204*c* searches, in reverse chronological order of communication times, at first, pieces of communication data having communication times before the service initiation time, and, thereafter, pieces of communication data having communication times before the time of the specified oldest leading service of the service initiation sequence, for communication data whose transmission source and destination IP addresses and transmission source and destination TCP port numbers coincide with those of the received communication data, respectively. As a result, a single packet of communication data satisfying the condition described at step S97 is extracted.

Here, the service initiation extraction unit 1204*c* determines whether the communication data described above is extracted with being coincident with the assumed sequence stored in the assumed sequence storage unit 1212 (step S99). For the assumed sequence, each time step 97 is executed, a target packet for determination is specified by retracing, on a one-by-one basis, pieces of the communication data before the service initiation, so as to be compared.

When it is determined that the communication data is extracted with being coincident with the assumed sequence, the service initiation extraction unit 1204*c* holds the communication time of the communication data described above as a leading time of the service initiation sequence (step S101). Then, the process goes back to step S97.

In a case where the process described above is repeatedly performed, the leading time of the communication time for the service initiation sequence may be specified by retracing the assumed sequence In the meantime, in a case where the corresponding communication data is not extracted or the communication data is not coincident with the assumed sequence even when the communication data is extracted, the service initiation extraction unit 1204*c* searches the association data storage unit 1206*c*, for external communication data being relevant to the received communication data, that is, having the transmission source IP address (SrcIP address) of the received communication data as a destination address, whose time difference from the leading time of the service initiation sequence falls within a predetermined time period (e.g., within 100 ms) (step S103).

The service initiation extraction unit 1204*c* determines whether the external communication data relevant to the received communication data is extracted (step S105). When it is determined that the external communication data relevant to the received communication data is not extracted, the process proceeds to step S95 through the encircled symbol D.

When the external communication data relevant to the received communication data is extracted, the service initiation extraction unit 1204*c* stores, in the association data storage unit 1206*c*, the service initiation data including the transmission destination IP address (DstIP address), the communication time of the received communication data, and the leading time of the service initiation sequence, in association with the extracted external communication data (step S107). Thereafter, the process proceeds to step S95 through the encircled symbol D.

For example, data as illustrated in FIG. 21 is stored in the association data storage unit 1206*c*. In the example of FIG. 21, the leading time of the service initiation sequence is also registered in the association data storage unit 1206*c*.

As described above, the process performed by the external connection extraction unit 1205 is similar to that of the second embodiment, and the description thereof will be omitted.

By performing the process described above, an attack may be accurately detected due to an accuracy improvement of association of the external communication data with the service initiation data.

Embodiment 4

In the third embodiment, the communication data is accumulated under the condition that the communication data is data regarding the same protocol of the service initiation and thus, a large quantity of communication data is accumulated in the communication data buffer 1211. Accordingly, a problem of storage volume or a retrieval speed may occur. In the embodiment, the communication data to be accumulated may be limited to efficiently specify the leading time of the service initiation sequence.

Figure 22:
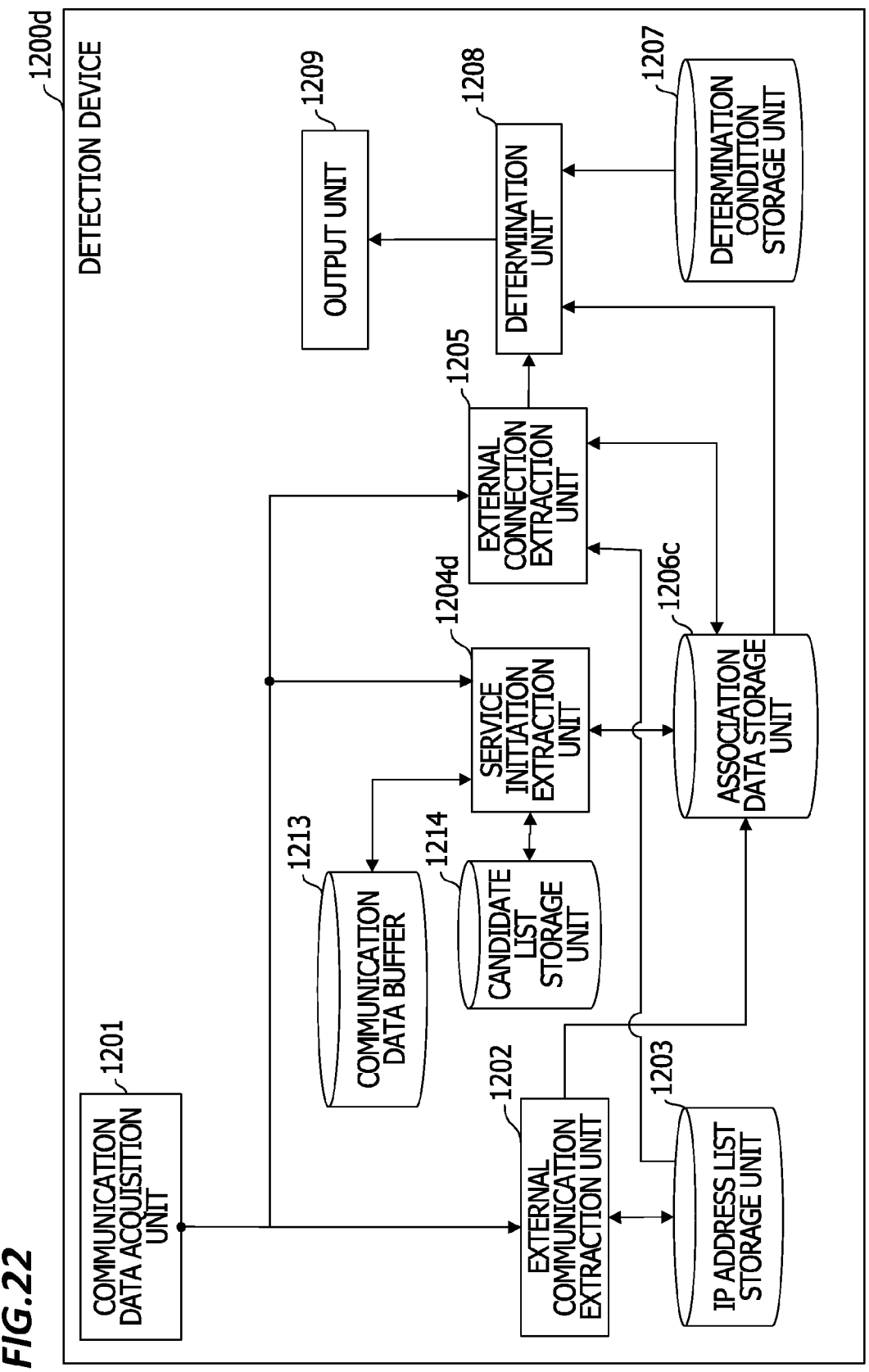
FIG. 22 is a diagram illustrating an example of a configuration of a detection device, according to an embodiment.

Therefore, the detection device 1200*d* as illustrated in FIG. 22 is employed in the embodiment.

The detection device 1200*d* according to the embodiment includes the communication data acquisition unit 1201, the external communication extraction unit 1202, the IP address list storage unit 1203, a service initiation extraction unit 1204*d*, the external connection extraction unit 1205, the association data storage unit 1206*c*, the determination condition storage unit 1207, the determination unit 1208, the output unit 1209, the communication data buffer 1213, and a candidate list storage unit 1214. The same constitutional elements as those of the first embodiment or the third embodiment are denoted by the same reference numerals.

The service initiation extraction unit 1204*d*, with reference to the candidate list storage unit 1214 which stores data of a leading candidate packet of the service initiation sequence, stores the communication data corresponding to the leading candidate packet in the communication data buffer 1213. Further, when the communication data regarding the service initiation is received, the service initiation extraction unit 1204*d* searches the communication data buffer 1213 for communication data regarding the service initiation to specify the communication time of the oldest communication data.

The candidate list storage unit 1214 stores, for example, data of the packet having an attribute of "leading candidate" in FIG. 16. A packet which is suitable for a leading packet of the service initiation sequence to be extracted is specified in advance and stored in the candidate list storage unit 1214.

Figure 23:
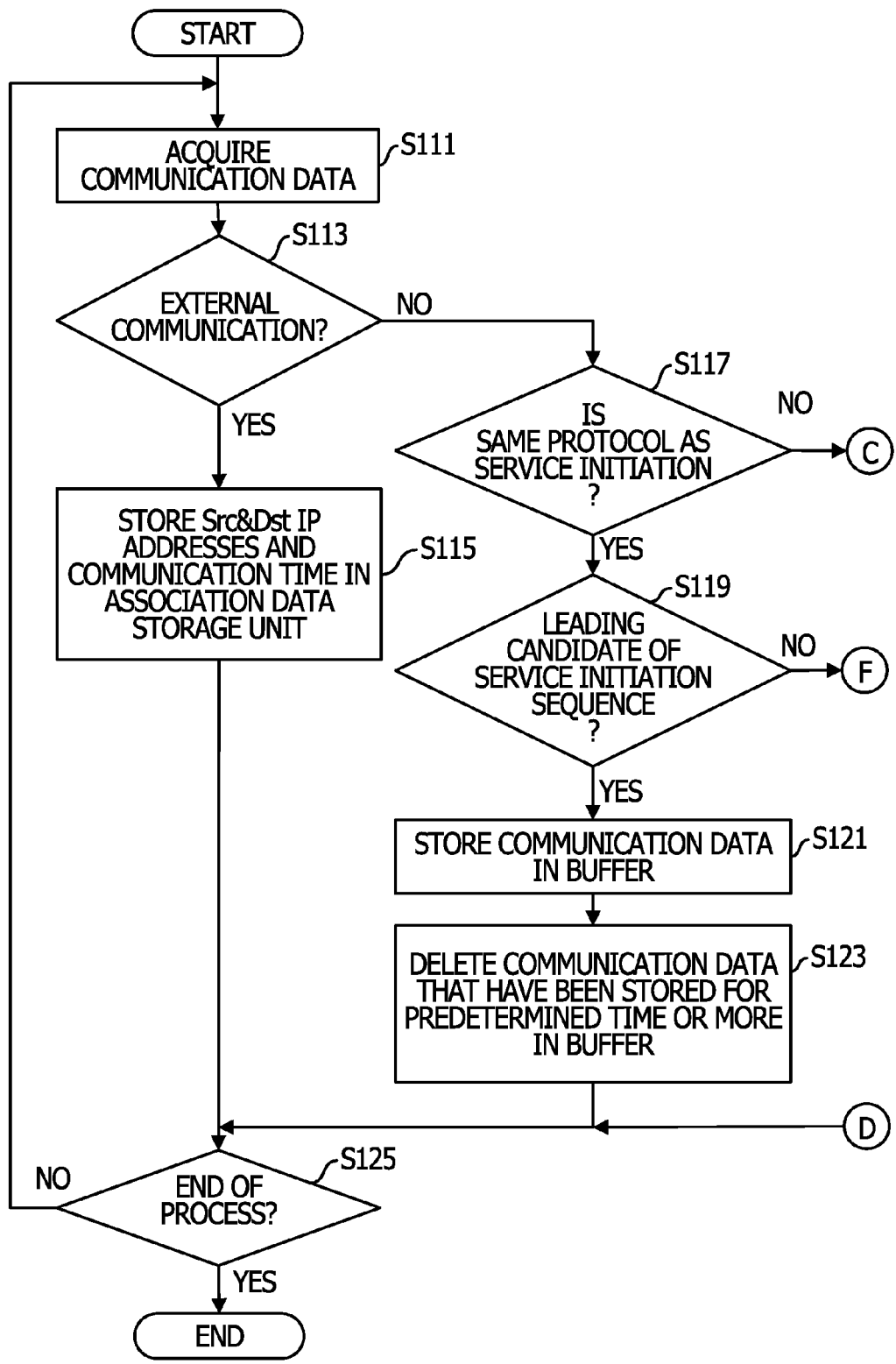
FIG. 23 is a diagram illustrating an example of an operational flowchart, according to an embodiment.
Figure 24:
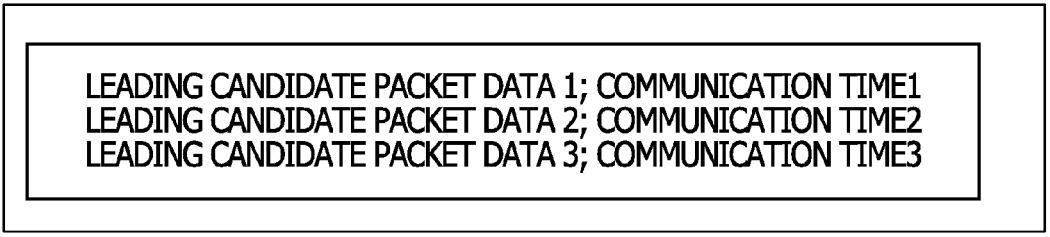
FIG. 24 is a diagram illustrating an example of data to be stored in a communication data buffer, according to an embodiment.

Next, the contents of a process according to a fourth embodiment will be described with reference to FIG. 23 to FIG. 25.

First, when the communication data is acquired from the communication device 1100 (step S111 of FIG. 23), the communication data acquisition unit 1201 outputs the communication data to the external communication extraction unit 1202, the service initiation extraction unit 1204*d*, and the external connection extraction unit 1205.

In contrast, when the communication data is received, the external communication extraction unit 1202 determines whether the communication regarding the communication data corresponds to the external communication (step S113). The operation of this step is similar to that of step S3 and step S5. When it is determined that the condition described at step S113 is not satisfied, the external communication extraction unit 1202 instructs the service initiation extraction unit 1204*d* to perform the process. That is, the process proceeds to step S117.

Meanwhile, when it is determined that the received communication data corresponds to the external communication, the external communication extraction unit 1202 stores the transmission source IP address (SrcIP address), the transmission destination IP address (DstIP address), and the communication time of the communication data, in the association data storage unit 1206*c* (step S115). Further, when the received communication data corresponds to the external communication, the external communication extraction unit 1202 causes the service initiation extraction unit 1204*d* and the external connection extraction unit 1205 to discard the communication data received at this time. For example, data as illustrated in FIG. 18 is stored in the association data storage unit 1206*c*.

Thereafter, for example, the communication data acquisition unit 1201 determines whether the instruction to end the process is made (step S125). When it is determined that the instruction to end the process is not made, the process goes back to step S111. When there is an instruction to end the process, the communication data acquisition unit 1201 ends the process.

When an instruction to perform the process is received from the external communication extraction unit 1202 (the determination result at step S113 is "NO"), the service initiation extraction unit 1204*d* determines whether the received communication data is the communication data regarding the same communication protocol as the service initiation (step S117). For example, the service initiation extraction unit 1204*c* determines whether the communication regarding the communication data is TCP communication having the transmission source port number of "139" or "445" or the transmission destination port number of "139" or "445".

When it is determined that the received communication data is not the communication data regarding the same communication protocol as the service initiation, the process proceeds to the process of FIG. 13 through the encircled symbol C. That is, the service initiation extraction unit 1204*c* instructs the external connection extraction unit 1205 to perform the process. FIG. 13 is similar to the second embodiment and thus, the descriptions thereof will be omitted.

In the meantime, when it is determined that the received communication data is the communication data regarding the same communication protocol as the service initiation, the service initiation extraction unit 1204*c* compares the received communication data with the candidate list stored in the candidate list storage unit 1214 to determine whether the received communication data corresponds to the leading candidate of the service initiation sequence (step S119). When it is determined that the condition described at step S119 is not satisfied, the process proceeds to a process of FIG. 25 through an encircled symbol F. Further, when the received communication data is determined as the communication data regarding the same communication protocol as the service initiation, the service initiation extraction unit 1204*d* causes the external connection extraction unit 1205 to discard the communication data received at this time.

In the meantime, when it is determined that the received communication data corresponds to the leading candidate of the service initiation sequence, the service initiation extraction unit 1204*d* stores the communication data along with the communication time in the communication data buffer 1213 so as to retrieve and specify the oldest leading candidate later (step S121). Further, the service initiation extraction unit 1204*d* deletes the communication data that have been stored for a predetermined time (e.g., 10 (ten) minutes) or more in the communication data buffer 1213, based on the communication time (step S123). Then, the process proceeds to step S125. Further, combinations of the packet data and the communication time that are the communication data of the leading candidate are accumulated in the communication data buffer 1213 as illustrated in FIG. 24.

Figure 25:
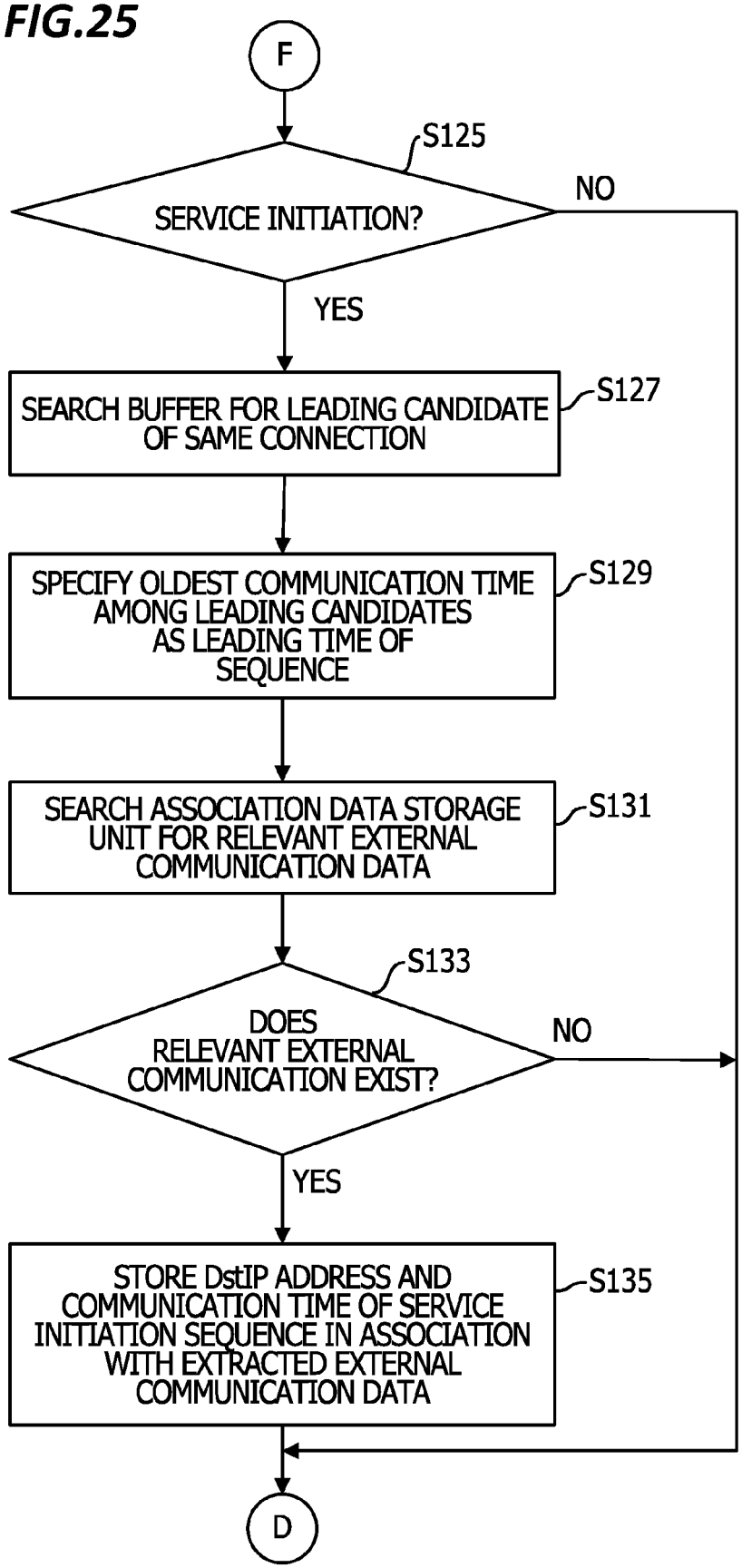
FIG. 25 is a diagram illustrating an example of an operational flowchart, according to an embodiment.

Referring to the description of a process illustrated in FIG. 25, the service initiation extraction unit 1204*d* searches the communication data buffer 1213 for communication data of the same connection, that is, communication data of the leading candidate of the service initiation sequence (step S127).

The service initiation extraction unit 1204*d* specifies the oldest communication time among the extracted communication data as the leading time of the sequence (step S129).

When the process described above is performed, the oldest leading time in the service initiation sequence may be specified by retracing the assumed sequence.

Thereafter, the service initiation extraction unit 1204*d* searches the association data storage unit 1206*c* for external communication data relevant to the received communication data, that is, the external communication data whose destination address is the transmission source IP address (SrcIP address) of the received communication data and whose time difference from the leading time of the sequence falls within a predetermined time period (e.g., within 100 ms) (step S131).

The service initiation extraction unit 1204*d* determines whether the external communication data relevant to the received communication data is extracted (step S133). When it is determined that the external communication data relevant to the received communication data is not extracted, the process proceeds to step S125 through the encircled symbol D.

In the meantime, when it is determined that the external communication data relevant to the received communication data is extracted, the service initiation extraction unit 1204*d* stores, in the association data storage unit 1206*c*, the service initiation data, which includes the transmission destination IP address (DstIP address), the communication time of the received communication data, and the leading time of the service initiation sequence, in association with the extracted external communication data (step S135). Thereafter, the process proceeds to step S125 through the encircled symbol D. For example, data as illustrated in FIG. 21 is stored in the association data storage unit 1206*c*.

As described above, the process performed by the external connection extraction unit 1205 is similar to that of the second embodiment and thus the description thereof will be omitted.

By performing the process described above, an accuracy of associating the external communication data with the service initiation data is improved, thereby allowing an attack to be accurately detected.

Further, it becomes possible to efficiently extract the leading time of the service initiation sequence.

While embodiments of the present disclosure are described, the present disclosure is not limited thereto. For example, the functional block diagrams of the detection devices 1200, 1200*b*, 1200*c*, and 1200*d* are examples of the functional block diagram and may not be identical with a configuration of a program module. Further, regarding the flow of process, a plurality of steps may be executed in parallel or a sequence of the steps may be changed as long as the result of the process is not varied. In the description as described above, a case where the external communication extraction unit, the service initiation extraction unit, and the external connection extraction unit are operated in serial is exemplified, but those units may be operated in parallel as well by being provided with an appropriate determination condition for the initiation of operation.

Further, some of the embodiments described above may be combined. Further, the communication device 1100 may be a switch, a firewall, or other device. Further, the detection devices 1200, 1200b, 1200c, and 1200d may be integrated with the communication device 1100.

Further, the assumed sequence is exemplified for the specified protocol, but the assumed sequence may be prepared for and cope with other protocol as well. Further, data may be prepared on the premise of a plurality of kinds of assumed sequences.

Further, the detection devices 1200, 1200b, 1200c, and 1200d may be each constituted by a plurality of computers rather than a single computer.

Figure 26:
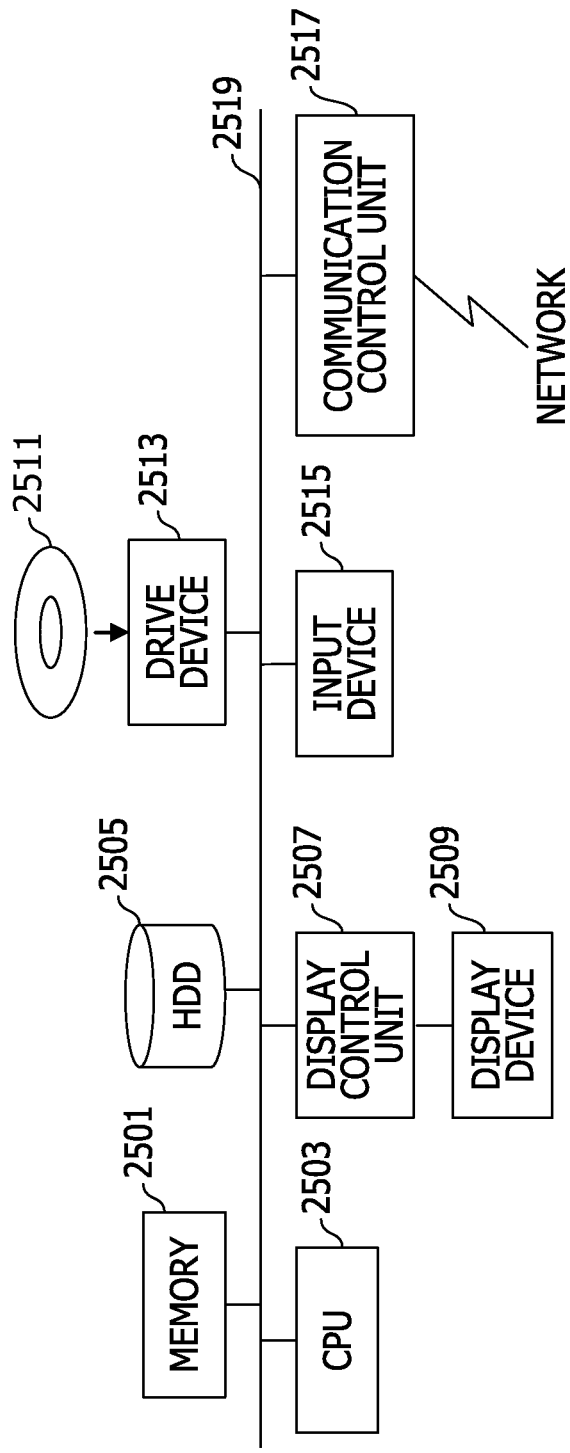
FIG. 26 is a diagram illustrating an example of a configuration of a computer, according to an embodiment.

Further, each of the detection devices 1200, 1200b, 1200c, and 1200d described above is a computer device, and, as illustrated in FIG. 26, a memory 2501, a central processing unit (CPU) 2503, a hard disk drive (HDD) 2505, a display control unit 2507 connected to a display device 2509, a drive device 2513 for a removable disk 2511, an input device 2515, and a communication control unit 2517 for connecting the computer to a network are connected to each other via a bus 2519. An operating system (OS) and application program for performing the process in the embodiments are stored in the HDD 2505 and read out from the HDD 2505 to the memory 2501 upon execution by the CPU 2503. The CPU 2503 controls the display control unit 2507, the communication control unit 2517, and the drive device 2513 to perform a predetermined operation, according to the contents of the process of the application program. Further, data during performance of the process are mainly stored in the memory 2501 but may be stored in the HDD 2505. In the embodiments, the application program for performing the process may be stored and distributed in the computer-readable removable disk 2511 and installed in the HDD 2505 from the drive device 2513. The application program may be installed in the HDD via a network, such as the Internet, and the communication control unit 2517. The hardware, such as the CPU 2503, or memory 2501 and the program, such as the OS or application program, organically cooperate with each other, thereby allowing the computer device to implement the various functions described above.

The embodiments described above may be summarized as follows.

The detection device according to an embodiment includes (A) an acquisition unit configured to acquire communication data, (B) an external communication specifying unit configured to store an external communication data including a transmission source address and a transmission destination address in a data storage unit when a first condition which includes a condition that the acquired communication data is a communication incoming from outside of a prescribed range in a network is satisfied, (C) a service initiation extraction unit configured to extract an external communication data having the transmission source address of the acquired communication data as the transmission destination address and store a service initiation data including the transmission destination address of the communication data in the data storage unit by associating the service initiation data with the external communication data when a second condition which includes a condition that the acquired communication data is a communication heading towards inside of the prescribed range and corresponds to predetermined communication data of service initiation is satisfied, and (D) a detection unit configured to determine whether a third condition which includes a condition that the service initiation data having the transmission source address of the acquired communication data as the transmission destination address is stored in the data storage unit and the transmission destination address of the acquired communication data is coincident with the transmission source address included in the external communication data which is associated with the service initiation data is satisfied when the acquired communication data is a communication heading towards outside of the prescribed range and notify an attack when the third condition is satisfied.

As described above, the relevancy with data may be scanned to detect an attack to a targeted terminal performed by infecting a terminal infected with the remote-controlled type malware and setting the terminal as a steppingstone for attack.

Further, the external communication data described above may further include the communication time of the acquired communication data. In this case, the service initiation extraction unit may extract the external communication data having the transmission source address of the acquired communication data as the transmission destination address and maintaining a communication time difference between the communication time of the acquired communication data and the communication time of the external communication data that falls within a first predetermined period of time. By doing this, the accuracy of attack detection is improved.

Further, the service initiation data described above may further include the communication time of the acquired communication data. In this case, the third condition may further include a condition that a difference between the communication time of the acquired communication data and the communication time included in the service initiation data falls within a second predetermined period of time. By doing this, the accuracy of attack detection is improved.

Further, the first condition may further include a condition that the duration of connection between the transmission source address and the transmission destination address of the acquired communication data is a third predetermined period of time or more. The attack detection may be improved using characteristics of the attack described above.

Further, the service initiation extraction unit may be configured to (c1) store the communication data and the communication time of the communication data in a buffer when the acquired communication data is a communication heading towards inside of the prescribed range and does not correspond to predetermined communication data of service initiation, (c2) specify the communication time of the communication data, which is related to the connection between the transmission source address and the transmission destination address of the acquired communication data and has been subjected to the service initiation and is the oldest among a prescribed communication sequence, in the buffer when a condition that the acquired communication data is a communication heading towards inside of the prescribed range and corresponds to predetermined communication data of service initiation is satisfied, and (c3) extract the external communication data having the transmission source address of the acquired communication data as the transmission destination address and maintaining the communication time difference between the specified communication time and the external communication data that falls within a fourth predetermined period of time from the data storage unit.

By doing this, the accuracy of association of the external communication data with the service initiation data may be improved.

Further, the service initiation extraction unit may be configured to (c4) store the communication data and the communication time of the communication data in the buffer when the acquired communication data is a communication heading towards inside of the prescribed range and does not correspond to predetermined communication data of service initiation and corresponds to a candidate of initiation of the prescribed communication sequence, (c5) specify the communication time of the communication data, which is related to the connection between the transmission source address and the transmission destination address of the acquired communication data and is the oldest, in the buffer when a condition that the acquired communication data is a communication heading towards inside of the prescribed range and corresponds to predetermined communication data of service initiation is satisfied, and (c6) extract the external communication data having the transmission source address of the acquired communication data as the transmission destination address and maintaining the communication time difference between the specified communication time and the external communication data that falls within a fifth predetermined period of time from the data storage unit.

By doing this, the accuracy of association of the external communication data with the service initiation data is improved and thus, an efficient process is performed.

Further, a program for executing the process described above by the computer may be created and the program may be stored in a computer readable storage medium or a storage device, such as, for example, a flexible disk, an optical disk such as a CD-ROM, an opto-magnetic disk, a semiconductor memory (e.g., ROM) and a hard disk. Further, the data used during the process may be temporarily stored in the storage device such as a RAM.

Embodiments including the embodiments described above are covered by the following claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
   a memory configured to store information on communication data; and
   a processor configured:
   to acquire the communication data;
   to store, when the acquired communication data meets a first condition including a condition that the acquired communication data is first communication data transmitted from an outside of a predetermined range in a network, in the memory, first information regarding an external communication and including transmission source and destination addresses of the first communication data,
   to extract, when the acquired communication data meets a second condition including a condition that the acquired communication data is second communication data that is addressed to an inside of the predetermined range and indicates predetermined communication data of service initiation, from the memory, the first information including as the transmission source address a source address of the acquired communication data, and store, in the memory in association with the first information, second information indicating a service initiation and including a destination address of the second communication data, and
   to determine, when the acquired communication data is addressed to an outside of the predetermined range, whether the acquired communication data meets a third condition including a condition that the second information including as the transmission destination address a source address of the second communication data is stored in the memory and a destination address of the second communication data is coincident with the transmission source address included in the first information associated with the second information, and notify detection of an attack when it is determined that the acquired communication data meets the third condition.

2. The apparatus of claim 1, wherein
   the first information further includes a first communication time at which the first communication data is received; and
   the processor extracts, from the memory, the first information including a source address of the acquired communication data as the transmission destination address of the first communication data and including the first communication time whose difference from a reception time of the acquired communication data falls within a first predetermined period of time.

3. The apparatus of claim 2, wherein
   the second information further includes a second communication time at which the second communication data is received; and
   the third condition further includes a condition that a difference between the second communication time and the reception time of the acquired communication data falls within a second predetermined period of time.

4. The apparatus of claim 1, wherein
   the first condition further includes a condition that duration time of connection between the source and destination addresses of the acquired communication data is equal to or greater than a third predetermined period of time.

5. The apparatus of claim 1, wherein
   the processor stores, in a buffer, the acquired communication data and a reception time at which the acquired communication data is received, when the acquired communication data is addressed to an inside of the predetermined range and does not correspond to predetermined communication data of service initiation; and
   when the acquired communication data is the second communication data, the processor specifies, from among pieces of information regarding the communication data that are related to the connection between source and destination addresses of the acquired communication data in the buffer and have been subjected to the service initiation, a reception time of a piece of the communication data that has been subjected to the service initiation and is oldest in a prescribed communication sequence executed before beginning of the service initiation; and
   the processor extracts, from the memory, the first information that includes:
   a source address of the acquired communication data as a transmission destination address, and
   the first communication time whose difference from the specified communication time falls within a fourth predetermined period of time.

6. The apparatus of claim 1, wherein
when the acquired communication data is addressed to an inside of the predetermined range, and does not correspond to initiation of the predetermined communication data of service initiation but corresponds to a candidate for initiation of the predetermined communication sequence, the processor stores, in the buffer, the acquired communication data and a reception time of the acquired communication data;
when the acquired communication data is the second communication data, the processor specifies, from among pieces of information being stored in the buffer and regarding the communication data related to the connection between source and destination addresses of the acquired communication data, a reception time of a piece of the communication data that is oldest in a predetermined communication sequence; and
the processor extracts, from the memory, the first information that includes:
  a source address of the acquired communication data as a transmission destination address, and
  the first communication time whose difference from the specified communication time falls within a fifth predetermined period of time.

7. A non-transitory, computer-readable recording medium having stored therein a program for causing a computer to execute a process comprising:
acquiring communication data;
when the acquired communication data meets a first condition including a condition that the acquired communication data is first communication data transmitted from an outside of a predetermined range in a network, storing, in a memory, first information regarding an external communication and including a transmission source and destination addresses of the first communication data;
when the acquired communication data meets a second condition including a condition that the acquired communication data is second communication data that is addressed to an inside of the predetermined range and indicates predetermined communication data of service initiation, extracting, from the memory, the first information including as the transmission source address a source address of the acquired communication data, and store, in the memory in association with the first information, second information indicating a service initiation and including a destination address of the second communication data; and
when the acquired communication data is addressed to an outside of the predetermined range, determining whether the acquired communication data meets a third condition including a condition that the second information including as the transmission destination address a source address of the second communication data is stored in the memory and a destination address of the second communication data is coincident with the transmission source address included in the first information associated with the second information, and notify detection of an attack when it is determined that the acquired communication data meets the third condition.

8. A detection method comprising:
acquiring communication data;
when the acquired communication data meets a first condition including a condition that the acquired communication data is first communication data transmitted from an outside of a predetermined range in a network, storing, in a memory, first information regarding an external communication and including a transmission source and destination addresses of the first communication data;
when the acquired communication data meets a second condition including a condition that the acquired communication data is second communication data that is addressed to an inside of the predetermined range and indicates predetermined communication data of service initiation, extracting, from the memory, the first information including as the transmission source address a source address of the acquired communication data, and store, in the memory in association with the first information, second information indicating a service initiation and including a destination address of the second communication data; and
when the acquired communication data is addressed to an outside of the predetermined range, determining whether the acquired communication data meets a third condition including a condition that the second information including as the transmission destination address a source address of the second communication data is stored in the memory and a destination address of the second communication data is coincident with the transmission source address included in the first information associated with the second information, and notify detection of an attack when it is determined that the acquired communication data meets the third condition.

* * * * *